United States Patent
Shimogawa

(10) Patent No.: US 9,703,591 B2
(45) Date of Patent: Jul. 11, 2017

(54) WORKLOAD DISTRIBUTION MANAGEMENT APPARATUS AND CONTROL METHOD

(71) Applicant: FUJITSU LIMITED, Kawasaki-shi, Kanagawa (JP)

(72) Inventor: Kenichirou Shimogawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/754,758

(22) Filed: Jun. 30, 2015

(65) Prior Publication Data
US 2016/0070602 A1  Mar. 10, 2016

(30) Foreign Application Priority Data
Sep. 10, 2014 (JP) .................. 2014-184311

(51) Int. Cl.
*G06F 9/455* (2006.01)
*G06F 9/50* (2006.01)

(52) U.S. Cl.
CPC .......... *G06F 9/45558* (2013.01); *G06F 9/505* (2013.01); *G06F 9/5077* (2013.01); *G06F 2009/4557* (2013.01); *G06F 2009/45562* (2013.01); *G06F 2209/5019* (2013.01)

(58) Field of Classification Search
CPC .................................................. G06F 9/45558
See application file for complete search history.

(56) References Cited

U.S. PATENT DOCUMENTS

| 2010/0030877 | A1 | 2/2010 | Yanagisawa | |
|---|---|---|---|---|
| 2012/0066684 | A1 | 3/2012 | Takami | |
| 2012/0180045 | A1* | 7/2012 | Bhogal | G06F 9/50 718/1 |
| 2014/0201554 | A1* | 7/2014 | Yamazaki | G06F 1/3287 713/324 |
| 2016/0162308 | A1* | 6/2016 | Chen | G06F 9/45558 718/1 |

FOREIGN PATENT DOCUMENTS

| JP | 2012-181647 | 9/2012 |
|---|---|---|
| WO | 2008-102739 | 8/2008 |
| WO | 2010-140183 | 12/2010 |

\* cited by examiner

*Primary Examiner* — Charlie Sun
(74) *Attorney, Agent, or Firm* — Fujitsu Patent Center

(57) ABSTRACT

In installing a new virtual machine on one of physical machines, a calculating unit selects an existing virtual machine amongst a plurality of existing virtual machines already deployed on the physical machines based on information about a use form of the new virtual machine and information about a use form of each of the existing virtual machines. The calculating unit predicts a workload on each of the physical machines using history information indicating past workload status of the selected existing virtual machine, and determines an installation-target physical machine for the new virtual machine based on the prediction results.

11 Claims, 23 Drawing Sheets

FIG. 6

| PHYSICAL MACHINE MANAGEMENT TABLE | | | | 111 |
|---|---|---|---|---|
| PHYSICAL MACHINE NAME | CPU USAGE | NW USAGE | RUNNING VM NAME | |
| SV1 | 80 % | 550 MB/s | userA-vm1, userB-vm1, userC-vm1 | |
| SV2 | 50 % | 420 MB/s | userA-vm2, userB-vm2, userC-vm2, userD-vm1 | |
| SV3 | 40 % | 600 MB/s | userB-vm3, userC-vm3, userD-vm2 | |

FIG. 7

| STORAGE UNIT MANGEMENT TABLE ||| 112 |
|---|---|---|
| STORAGE UNIT NAME | STORAGE ACCESS RATE | STORAGE-USING VM NAME |
| STG1 | 300 MB/s | userA-vm1, userB-vm1, userC-vm1, userD-vm1 |
| STG2 | 220 MB/s | userB-vm2, userC-vm2, userD-vm2 |
| STG3 | 180 MB/s | userA-vm2, userB-vm3, userC-vm3 |

FIG. 9

| VM MANAGEMENT TABLE ||||
|---|---|---|---|
| TENANT NAME | VM NAME | VM TYPE | CREATED DATE AND TIME |
| userA | userA-vm1 | image-a | 2014/06/01 0:00 |
| userA | userA-vm2 | image-a | 2014/06/01 0:00 |
| userB | userB-vm1 | image-b | 2014/06/05 10:00 |
| ... | ... | ... | ... |

FIG. 10

| WORKLOAD HISTORY TABLE (VIRTUAL MACHINE: userA-vm1) | | | | |
|---|---|---|---|---|
| DATE | TIME | CPU USAGE | NW USAGE | STORAGE ACCESS RATE |
| 2014/7/1 | 00:00:00 | 20 % | 60 MB/s | 30 MB/s |
| 2014/7/1 | 00:00:10 | 30 % | 66 MB/s | 50 MB/s |
| ... | ... | ... | ... | ... |
| 2014/7/1 | 23:59:50 | 28 % | 50 MB/s | 10 MB/s |
| ... | ... | ... | ... | ... |

VM TYPE TABLE 116

| VM TYPE | SPECIFICATIONS | | | | | OS | MW | WORKLOAD DISTRIBUTION |
|---|---|---|---|---|---|---|---|---|
| | NUMBER OF VIRTUAL CPUS | CLOCK FREQUENCY | MEMORY CAPACITY | DISK CAPACITY | NUMBER OF CONNECTED NWS | | | |
| image-a | 2 | 2 GHz | 2 GB | 50 GB | 2 | OS-W | MW1 | USE |
| image-b | 2 | 1 GHz | 1 GB | 30 GB | 1 | OS-L | MW2 | NON-USE |
| image-c | 1 | 1 GHz | 1 GB | 10 GB | 1 | OS-C | MW3 | NON-USE |
| ... | ... | ... | ... | ... | ... | ... | ... | ... |

FIG. 11

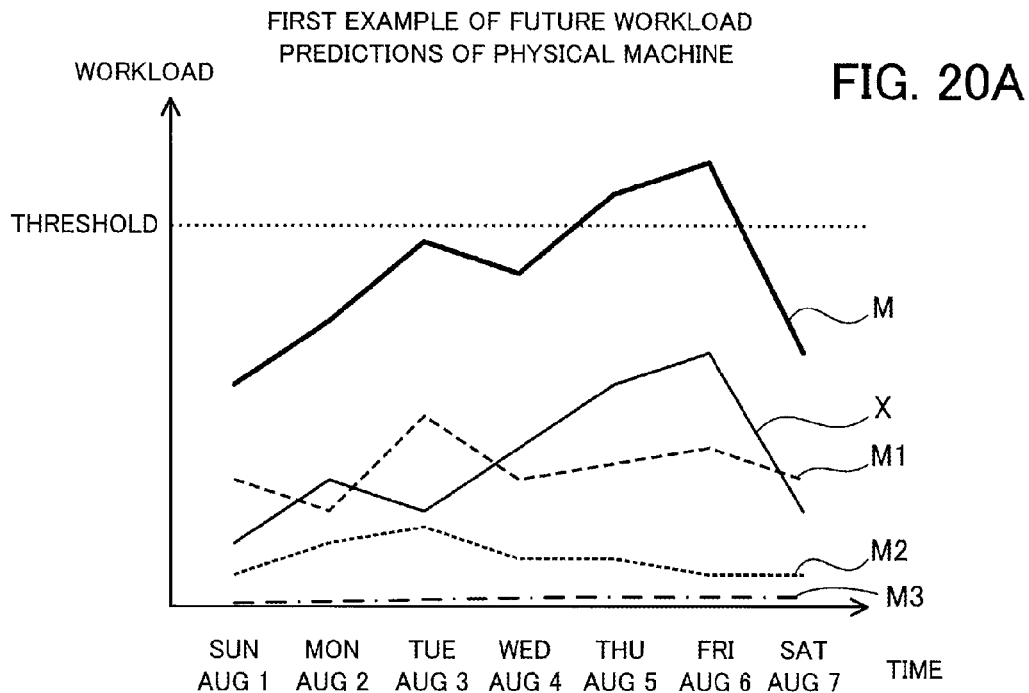
FIG. 20A — First example of future workload predictions of physical machine
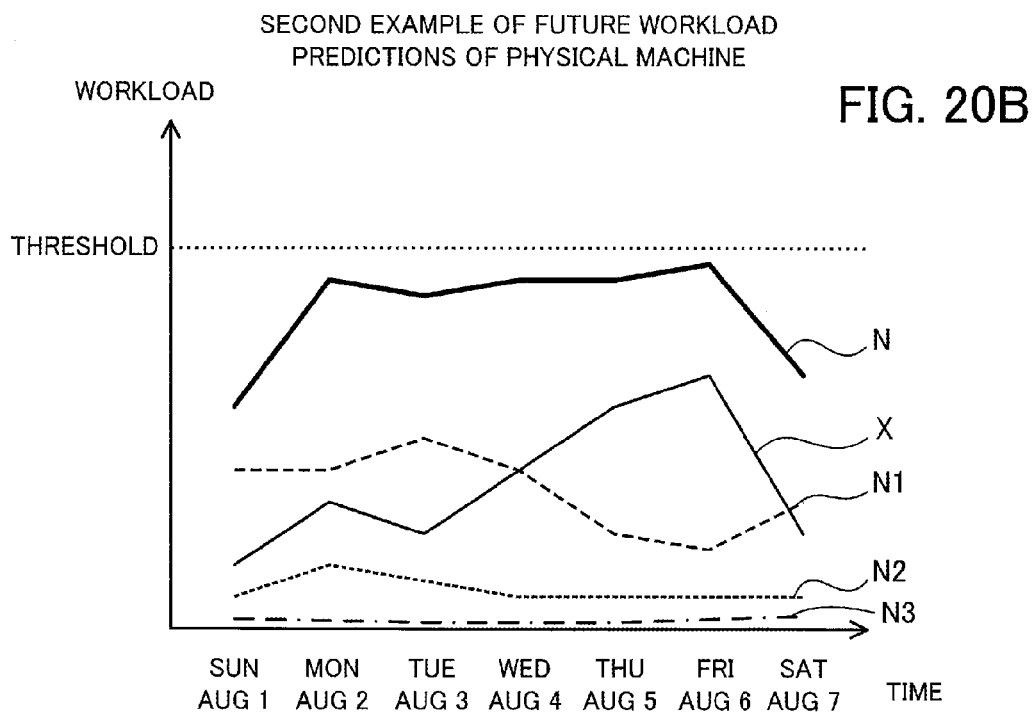
FIG. 20B — Second example of future workload predictions of physical machine

WORKLOAD DISTRIBUTION MANAGEMENT APPARATUS AND CONTROL METHOD

CROSS-REFERENCE TO RELATED APPLICATION

This application is based upon and claims the benefit of priority of the prior Japanese Patent Application No. 2014-184311, filed on Sep. 10, 2014, the entire contents of which are incorporated herein by reference.

FIELD

The embodiments discussed herein are related to a workload distribution management apparatus and a control method.

BACKGROUND

In the field of information processing, virtualization technology has been used that runs a plurality of virtual computers (sometimes referred to as the "virtual machines" or "logical hosts") on a physical computer (sometimes referred to as the "physical machine" or "physical host"). On each of the virtual machines, software such as an operating system (OS) is able to run. Each physical machine using virtualization technology runs software to manage a plurality of virtual machines. For example, software called hypervisor is used to allocate, to a plurality of virtual machines, processing power of the central processing unit (CPU) and a storage area of random access memory (RAM) as computational resources.

Resources of the physical machine are limited. On the other hand, the processing loads on the virtual machines (that is, loads on the resources allocated to the virtual machines) are likely to increase and decrease over time depending on the usage situation of users. In view of this, techniques have been proposed to change the original deployment of a plurality of virtual machines in running the virtual machines by using a plurality of physical machines.

For example, a technique has been proposed to calculate every week an hourly moving average for workload values of each virtual server using information on a workload on the virtual server over a predetermined period of time up to the current time, to thereby predict the future workload on the virtual server. In this technique, the virtual servers are relocated in such a manner that the sum of the workload values of the virtual servers falls within an acceptable range of the processing power of a physical server on which the virtual servers are deployed.

Another proposed technique is directed to moving, when the resource use rate of a physical server exceeds a predetermined high workload threshold, virtual servers running on the physical server to another physical server with a relatively low resource use rate, to thereby even out the resource use rates of the physical servers.

International Publication Pamphlet No. WO 2010140183
International Publication Pamphlet No. WO 2008102739

In addition to a plurality of virtual machines already deployed (hereinafter referred to as "existing virtual machines"), a new virtual machine may be installed on one of a plurality of physical machines. Because no previous workload information exists for the new virtual machine, it is difficult to predict a workload on the new virtual machine by the above-described method. Therefore, how to determine a physical machine on which the new virtual machine is to be installed becomes a problem.

It may be considered to determine the installation-target physical machine by a round-robin system (a method whereby each physical machine is selected sequentially), or determine a physical machine to be put under the lowest workload at the time of the installation of the new virtual machine thereon as the installation-target physical machine. However, even if the workload on the physical machine with the new virtual machine installed thereon falls within an acceptable range at the beginning of the installation, the workload may not always subsequently remain within the acceptable range. If the workload on the newly installed virtual machine increases more than expected, the physical machine may be put under an excessive workload.

SUMMARY

According to an aspect, there is provided a workload distribution management apparatus including a memory configured to store first information about a use form of each of a plurality of existing virtual machines already deployed on a plurality of physical machines and history information indicating past workload status of each of the existing virtual machines; and a processor configured to perform a procedure including selecting, in installing a new virtual machine on one of the physical machines, an existing virtual machine amongst the existing virtual machines based on the first information and second information about a use form of the new virtual machine, predicting, using the history information of the selected existing virtual machine, a workload on each of the physical machines being installation-target options for the new virtual machine, and determining, amongst the physical machines, an installation-target physical machine based on results of the predicting.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a physical machine management table;
FIG. 7 illustrates an example of a storage unit management table;
FIG. 9 illustrates an example of a virtual machine management table;
FIG. 10 illustrates an example of a workload history table;
FIG. 11 is an example of a virtual machine type table.

FIGS. 20A and 20B illustrate examples of future workload predictions for physical machines;

DESCRIPTION OF EMBODIMENTS

Figure 1:
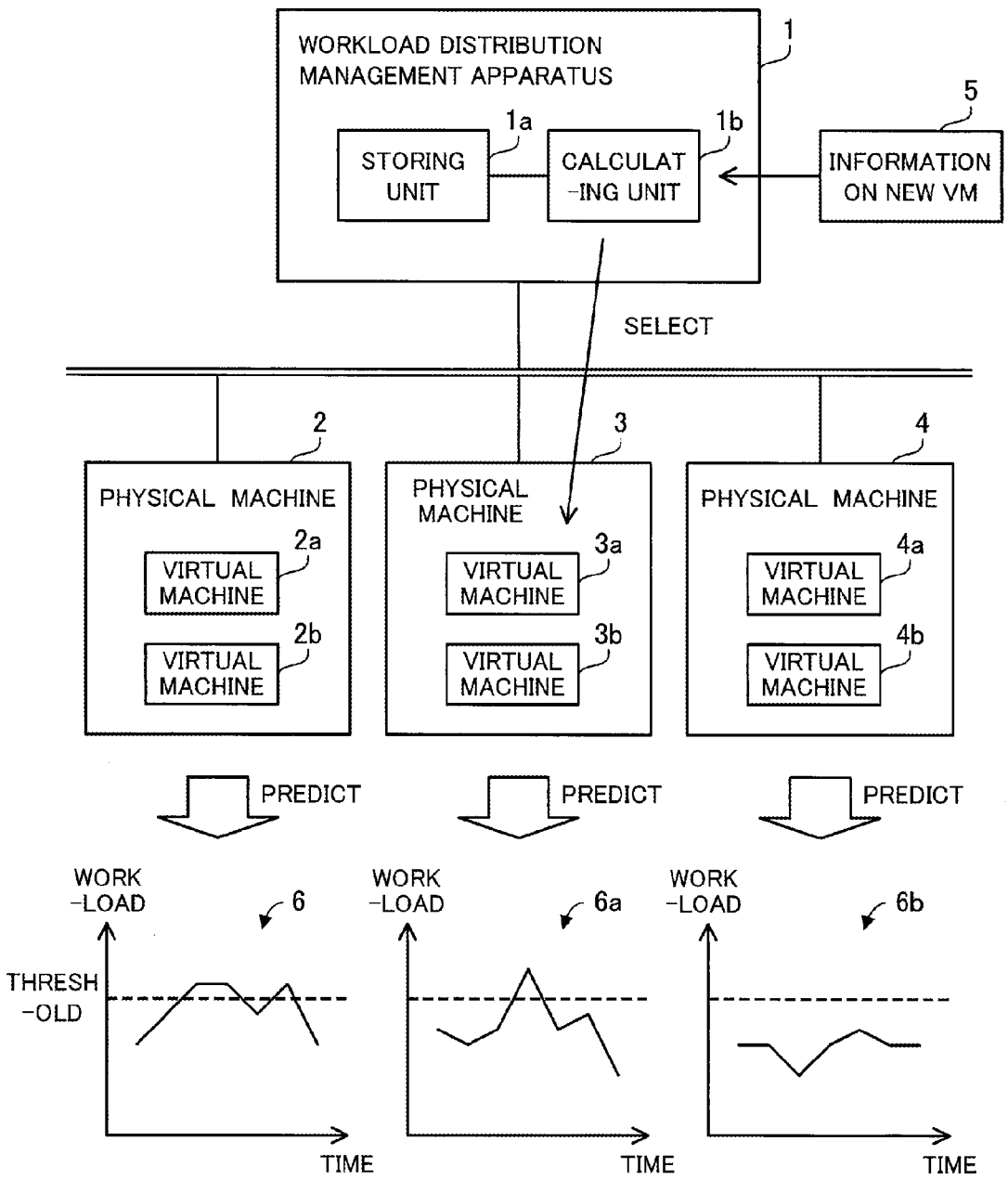
FIG. 1 illustrates an example of a workload distribution management apparatus according to a first embodiment.

Several embodiments will be described below with reference to the accompanying drawings, wherein like reference numerals refer to like elements throughout.

(a) First Embodiment

FIG. 1 illustrates an example of a workload distribution management apparatus according to a first embodiment. A workload distribution management apparatus 1 is able to communicate with physical machines 2, 3, and 4 via a network. Each of the physical machines 2, 3, and 4 runs virtual machines using physical resources such as a CPU and RAM. In addition, each of the physical machines 2, 3, and 4 may run a hypervisor, which, for example, allocates the physical resources of the corresponding physical machine 2, 3, or 4 to the virtual machines to thereby run the virtual machines thereon.

The workload distribution management apparatus 1 distributes workloads on the physical machines 2, 3, and 4 by managing the deployment of the virtual machines on the physical machines 2, 3, and 4. The workload distribution management apparatus 1 includes a storing unit 1a and a calculating unit 1b. The storing unit 1a may be volatile memory such as RAM, or non-volatile memory such as a hard disk drive (HDD) or flash memory. The calculating unit 1b may include, for example, a CPU, a digital signal processor (DSP), an application specific integrated circuit (ASIC), and a field programmable gate array (FPGA). The calculating unit 1b may be a processor executing programs. The term "processor" here includes a computer system having a plurality of processors (i.e., multiprocessor).

The storing unit 1a stores therein first information about usage forms of individual existing virtual machines 2a, 2b, 3a, 3b, 4a, and 4b already deployed on the physical machines 2, 3, and 4. The term "existing virtual machines" refers to virtual machines each having been run on the physical machine 2, 3, or 4 before the current time. The first information indicates how the virtual machines 2a, 2b, 3a, 3b, 4a, and 4b have been used, and includes, for example, the following information items for each of the virtual machines 2a, 2b, 3a, 3b, 4a, and 4b: (1) specifications (the amount of resources allocated thereto); (2) software (including an operating system (OS) and middleware) used; (3) primary use (for example, provision of a graphical user interface (GUI), execution of business applications, or database management); and (4) the number of networks connected thereto.

The storing unit 1a stores therein history information indicating past workload status of each of the virtual machines 2a, 2b, 3a, 3b, 4a, and 4b. The history information includes information about the workload on each of the virtual machines 2a, 2b, 3a, 3b, 4a, and 4b, which workload is represented, for example, by the utilization of resources (such as the CPU and RAM of a corresponding physical machine) and the communication traffic.

When installing a new virtual machine on one of the physical machines 2, 3, and 4, the calculating unit 1b selects an existing virtual machine based on the first information stored in the storing unit 1a and second information about the usage form of the virtual machine to be installed (the new virtual machine). The calculating unit 1b may select just one, or more than one, existing virtual machine. The second information indicates how the new virtual machine is to be used. As in the case with the first information, the second information may include information items of specifications, software to be used, primary use, and the number of networks connected thereto. For example, the calculating unit 1b acquires information indicating, for example, specifications of the new virtual machine and software to be used by the new virtual machine. The content of the information 5 is designated by a user of the new virtual machine, for example, together with an installation request for the new virtual machine. Based on the acquired information 5, the calculating unit 1b identifies the second information about the usage form of the new virtual machine.

The calculating unit 1b compares the first information of each of the virtual machines 2a, 2b, 3a, 3b, 4a, and 4b with the second information, to thereby select at least one of the virtual machines 2a, 2b, 3a, 3b, 4a, and 4b. For example, the calculating unit 1b selects one or more existing virtual machines whose information items (1) to (4) above match, or approximate, those of the new virtual machine.

Specifically, the calculating unit 1b is configured to select one or more existing virtual machines all or part of whose information items (1) to (4) above match those of the new virtual machine. Alternatively, the calculating unit 1b may calculate, for each of the information items (1) to (4), a score representing the degree of agreement between the first information of each of the virtual machines 2a, 2b, 3a, 3b, 4a, and 4b and the second information (the score representing the degree of agreement takes a larger value as the difference is smaller), and select one or more existing virtual machines with the largest total score of the information items (1) to (4). As for the information item (2), information may be stored in the storing unit 1a in advance, which defines scores each representing the degree of agreement between functions of the software used according to similarities in the functions of the software. Similarly, as for the information item (3), information may be stored in the storing unit 1a in advance, which defines scores each representing the degree of agreement between uses of the virtual machines according to similarities in the uses of the virtual machines. This allows the calculating unit 1b to refer to the information stored in the storing unit 1a, to thereby determine the degree of agreement for each of the information items (2) and (3).

The calculating unit 1b acquires, from the storing unit 1a, history information indicating past workload status of each of the selected existing virtual machines. Using the history information, the calculating unit 1b predicts the workload on each physical machine which is an installation-target option for the new virtual machine. The period over which the prediction is made (for example, a week or a month) is determined in advance.

Assume, for example, that the calculating unit 1b has selected the virtual machine 3a as an existing virtual machine. Using the history information indicating the past workload status of the virtual machine 3a, the calculating unit 1b predicts the future workload caused in each case where the new virtual machine is installed on the physical machine 2, 3, or 4. For example, the calculating unit 1b may regard the past workload on the virtual machine 3a as the workload on the new virtual machine and predict the future workload on each of the physical machines 2, 3, and 4 over the next one-week period. Alternatively, if the virtual machine 3a and the new virtual machine are used by the same user (or the same tenant), the calculating unit 1b may regard, as the workload on the new virtual machine, a workload obtained by dividing the workload on the virtual machine 3a equally between the new virtual machine and the virtual machine 3a.

The calculating unit 1b adds the latest one-week workload on the virtual machines 2a and 2b and the latest one-week workload on the virtual machine 3a with respect to each hour of each day of the week, to thereby calculate the future workload on the physical machine 2 for each hour of each day of the week in the case where the new virtual machine is installed on the physical machine 2. A graph 6 illustrates an example of prediction results for the future (for example, the next one-week) workload on the physical machine 2.

The calculating unit 1b adds the latest one-week workload on the virtual machines 3a and 3b and the latest one-week workload on the virtual machine 3a with respect to each hour of each day of the week, to thereby calculate the future workload on the physical machine 3 for each hour of each day of the week in the case where the new virtual machine is installed on the physical machine 3. A graph 6a illustrates an example of prediction results for the future (for example, the next one-week) workload on the physical machine 3.

The calculating unit 1b adds the latest one-week workload on the virtual machines 4a and 4b and the latest one-week workload on the virtual machine 3a with respect to each hour of each day of the week, to thereby calculate the future workload on the physical machine 4 for each hour of each day of the week in the case where the new virtual machine is installed on the physical machine 4. A graph 6b illustrates an example of prediction results for the future (for example, the next one-week) workload on the physical machine 4.

Assuming, alternatively, that the calculating unit 1b has selected the virtual machines 3a and 4a as the existing virtual machines, the calculating unit 1b predicts the future workload caused in each case where the new virtual machine is installed on the physical machine 2, 3, or 4 using the history information indicating the past workload status of the virtual machines 3a and 4a. For example, if the virtual machines 3a and 4a and the new virtual machine are used by the same user (or the same tenant), the calculating unit 1b may predict the future workload on each of the physical machines 2, 3, and 4 by regarding a workload obtained in the following manner as the future workload on the new virtual machine for each hour of each day of the week. That is, the workload is obtained by dividing the sum of the workloads on the virtual machines 3a and 4a for each hour of each day of the week in the past by a value obtained by adding 1 (corresponding to the new virtual machine) to the number of the virtual machines 3a and 4a. Alternatively, to be on the safe side, the calculating unit 1b may regard a higher workload on either one of the virtual machines 3a and 4a for each hour of each day of the week in the past as the future workload on the new virtual machine for a corresponding hour of the day of the week.

Based on the prediction results, the calculating unit 1b determines a physical machine on which the new virtual machine is to be installed. For example, a threshold is set for the workload on each of the physical machines 2, 3, and 4, and the calculating unit 1b determines a physical machine whose workload does not reach the threshold over a prediction period as the installation-destination physical machine. According to the example with the graphs 6, 6a, and 6b, the workload exceeds the threshold during the prediction period in both the graphs 6 and 6a. On the other hand, in the graph 6b, the workload remains below the threshold over the prediction period. Therefore, the calculating unit 1b determines the physical machine 4 as the installation target of the new virtual machine. Subsequently, the calculating unit 1b instructs the determined physical machine to start running the new virtual machine.

A plurality of physical machines may be found whose workloads remain below the threshold over the prediction period. In such a case, the calculating unit 1b may select, amongst the plurality of physical machines (the physical machines whose workloads remain below the threshold), a physical machine with the lowest peak workload (lowest maximum workload) over the prediction period. Alternatively, the calculating unit 1b may select a physical machine with the lowest average workload over the prediction period amongst the plurality of physical machines.

According to the workload distribution management apparatus 1, in installing a new virtual machine on one of the physical machines 2, 3, and 4, one or more existing virtual machines are selected based on information about the use form of the new virtual machine and information about the use form of each of the existing virtual machines 2a, 2b, 3a, 3b, 4a, and 4b already deployed on the physical machines 2, 3, and 4. The workload on each physical machine being an installation-target option for the new virtual machine is predicted using the history information indicating the past workload status of each of the selected existing virtual machines. Based on the prediction results, a physical machine on which the new virtual machine is to be installed is determined. In this manner, it is possible to select an appropriate installation-target physical machine.

In installing the new virtual machine on one of the physical machines 2, 3, and 4, because no past workload information exists for the new virtual machine, it is not possible to predict the workload on the new virtual machine by existing methods. Therefore, how to determine a physical machine on which the new virtual machine is to be installed becomes a problem.

For example, the installation-target physical machine may be determined by round-robin, or may be determined as a physical machine put under the lowest workload at the time of the installation of the new virtual machine thereon. However, even if the workload on the physical machine with the new virtual machine installed thereon is equal to or less than an acceptable value at the beginning of the installation, the workload may not always subsequently remain equal to or less than the acceptable value. If the workload on the newly installed virtual machine increases more than expected, the physical machine may be put under an excessive workload. When the workload exceeds the acceptable value, operations of the physical machine and virtual machines running on the physical machine may be adversely affected. In addition, in order to prevent or mitigate the adverse effects on the operations, extra steps or processing may be needed to migrate virtual machines to different physical machines.

On the other hand, the workload distribution management apparatus 1 is able to predict the workload on each of the physical machines 2, 3, and 4 with a high degree of accuracy by selecting, amongst the already deployed virtual machines 2a, 2b, 3a, 3b, 4a, and 4b, one or more virtual machines with similar use forms to that of the new virtual machine and using the workload history of the selected virtual machines. This is because it is considered that the new virtual machine is likely to be used for the same purpose as the existing virtual machines with the similar use forms, and the workload on the new virtual machine therefore has a strong association with the workloads on the existing virtual machines.

Especially in the case of selecting an existing virtual machine used by the same user (or the same tenant), the accuracy of predicting the workload on the new virtual machine is further improved by designating a workload obtained by distributing the workload on the existing virtual machine equally to the existing virtual machine and the new virtual machine as the workload on the new virtual machine. This is because it is considered that, in the case where the existing virtual machine and the new virtual machine are likely to be used by the same user (or the same tenant) for the same purpose, there is a strong possibility that part of the workload on the selected existing virtual machine will be transferred to the new virtual machine.

Because the workload distribution management apparatus 1 uses the prediction results to determine an installation target for the new virtual machine, it is possible to select an appropriate installation-target physical machine, compared to the case of determining the installation target by round-robin or according to the workload on each of the physical machines 2, 3, and 4 at the time of the installation of the new virtual machine. That is, it is possible to reduce the possibility of the workload on the physical machine with the new virtual machine installed thereon exceeding the acceptable value in the future. In addition, it is also possible to reduce the possibility of creating a need for migrating virtual machines running on the physical machine to different physical machines, thus improving operational efficiency.

(b) Second Embodiment

Figure 2:
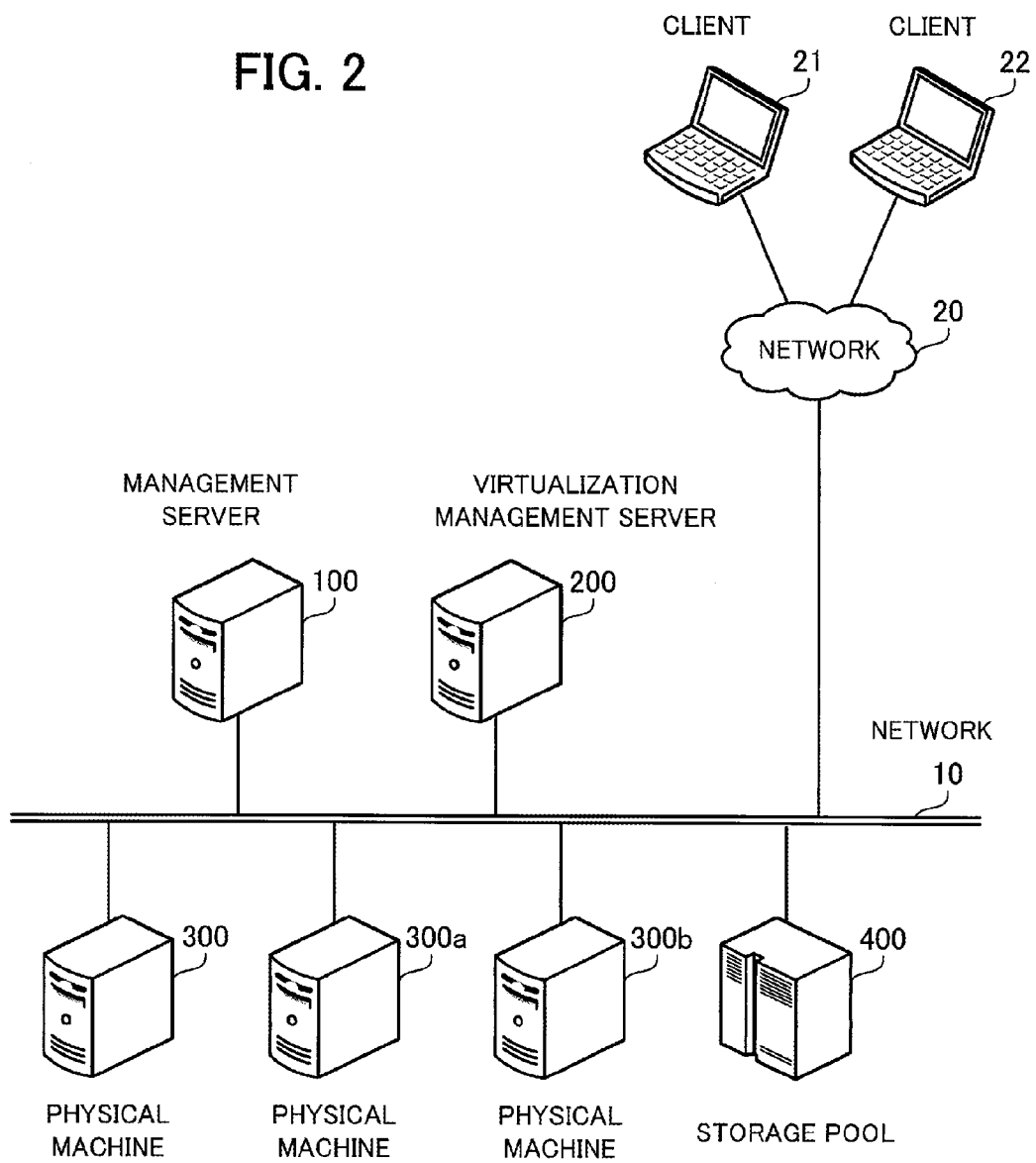
FIG. 2 illustrates an example of an information processing system according to a second embodiment.

FIG. 2 illustrates an example of an information processing system according to a second embodiment. The information processing system of the second embodiment includes a management server 100, a virtualization management server 200, physical machines 300, 300a, and 300b, and a storage pool 400. The management server 100, the virtualization management server 200, the physical machines 300, 300a, and 300b, and the storage pool 400 are connected to the network 10. The network 10 is, for example, a local area network (LAN) installed in a data center. The network 10 is connected to a network 20, which is a broad area network, such as the Internet or a wide area network (WAN). To the network 20, clients 21 and 22 are connected. The clients 21 and 22 are client computers used by users.

The users operate the clients 21 and 22 to thereby use virtual machines running on the physical machines 300, 300a, and 300b. That is, the users do not have to manage server computers (physical machines) and storage apparatuses on their own, and are able to use resources of server computers and storage apparatuses installed in the data center. Such a computer use form is sometimes referred to as "cloud computing". In addition, users renting resources from the data center are sometimes referred to as "tenants".

The management server 100 is a server computer for managing the deployment of virtual machines on the physical machines 300, 300a, and 300b. In installing a new virtual machine on one of the physical machines 300, 300a, and 300b, the management server 100 predicts the future workload on each of the physical machines 300, 300a, and 300b and determines an installation-target physical machine for the new virtual machine according to the prediction results. The management server 100 is an example of the workload distribution management apparatus 1 of the first embodiment.

The virtualization management server 200 collects information about the workload on each of the physical machines 300, 300a, and 300b and provides the information to the management server 100. Note however that the management server 100 may collect the workload information directly from the physical machines 300, 300a, and 300b. In this case, the virtualization management server 200 may not be included in the information processing system.

Each of the physical machines 300, 300a, and 300b is a server computer capable of running a plurality of virtual machines thereon. The physical machines 300, 300a, and 300b individually run a hypervisor. The hypervisor of each of the physical machines 300, 300a, and 300b causes virtual machines to work using physical resources of the corresponding physical machine 300, 300a, or 300b. Note that a virtual machine is sometimes abbreviated to "VM".

The storage pool 400 is a storage apparatus with a plurality of HDDs. The HDDs included in the storage pool 400 are used as secondary storage devices of the individual virtual machines. In the following description, one collective set of HDDs included in the storage pool 400 is called a "storage unit". The storage pool 400 includes a plurality of storage units. Note that the storage pool 400 may include a different type of non-volatile memory devices, such as solid state drives (SSDs) in place of, or in addition to, the HDDs.

Figure 3:
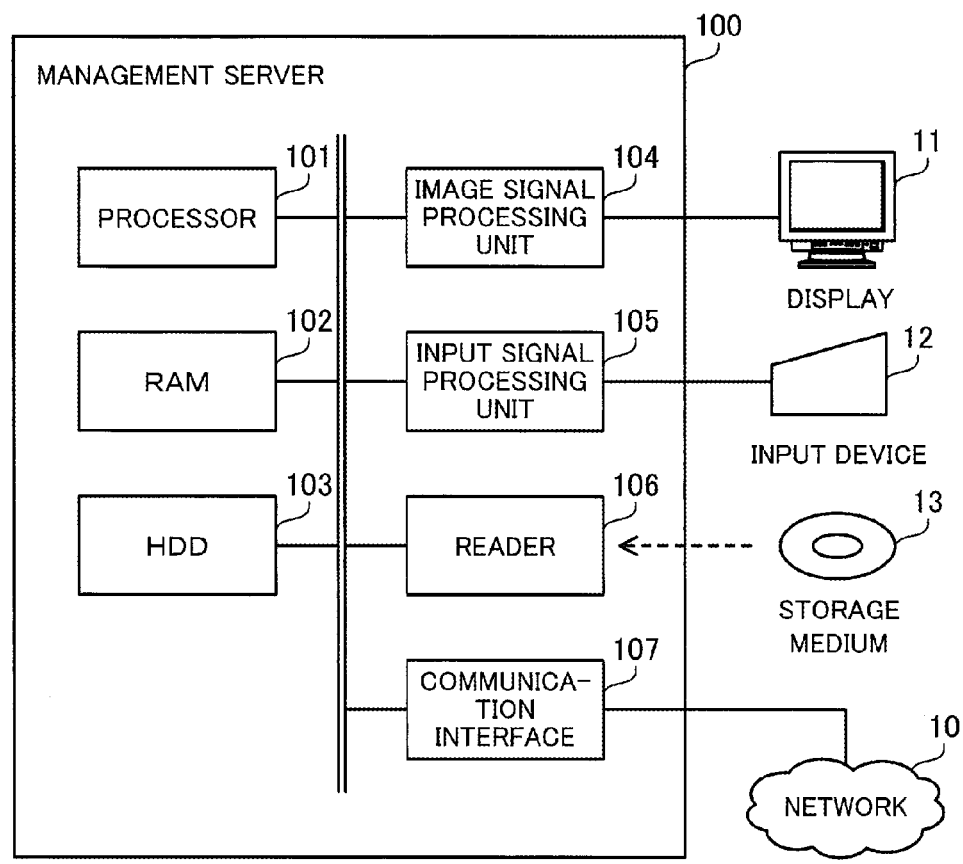
FIG. 3 illustrates an example of hardware of a management server.

FIG. 3 illustrates an example of hardware of a management server. The management server 100 includes a processor 101, RAM 102, a HDD 103, an image signal processing unit 104, an input signal processing unit 105, a reader 106, and a communication interface 107. Each of these units is connected to a bus of the management server 100. The virtualization management server 200, the physical machines 300, 300a, and 300b, and the clients 21 and 22 may individually be implemented using the same hardware components as the management server 100.

The processor 101 controls information processing of the management server 100. The processor 101 may be a multi-processor. The processor 101 is, for example, a CPU, a DSP, an ASIC, a FPGA, or a combination of two or more of these. The RAM 102 is used as the main storage device of the management server 100. The RAM 102 temporarily stores at least part of an operating system (OS) program and application programs to be executed by the processor 101. The RAM 102 also stores therein various types of data to be used by the processor 101 for its processing.

The HDD 103 is a secondary storage device of the management server 100, and magnetically writes and reads data to and from a built-in magnetic disk. The HDD 103 stores therein the OS program, application programs, and various types of data. Instead of the HDD 103, the management server 100 may be provided with a different type of secondary storage device such as flash memory or a SSD, or may be provided with a plurality of secondary storage devices.

The image signal processing unit 104 outputs an image to a display 11 connected to the management server 100 according to an instruction from the processor 101. A cathode ray tube (CRT) display or a liquid crystal display, for example, may be used as the display 11. The input signal processing unit 105 acquires an input signal from an input device 12 connected to the management server 100, and outputs the signal to the processor 101. A pointing device, such as a mouse and a touch panel, or a keyboard may be used as the input device 12.

The reader 106 is a device for reading programs and data recorded on a storage medium 13. Examples of the storage medium 13 include a magnetic disk such as a flexible disk (FD) and a HDD, an optical disk such as a compact disc (CD) and a digital versatile disc (DVD), and a magneto-optical disk (MO). Alternatively, a non-volatile semiconductor memory, such as a flash memory card, may be used as the storage medium 13. The reader 106 stores programs and data read from the storage medium 13 in the RAM 102 or the HDD 103, for example, according to an instruction from the processor 101. The communication unit 107 communicates with other apparatuses via the network 10. The communication unit 107 may be either a wired or wireless communication interface.

Figure 4:
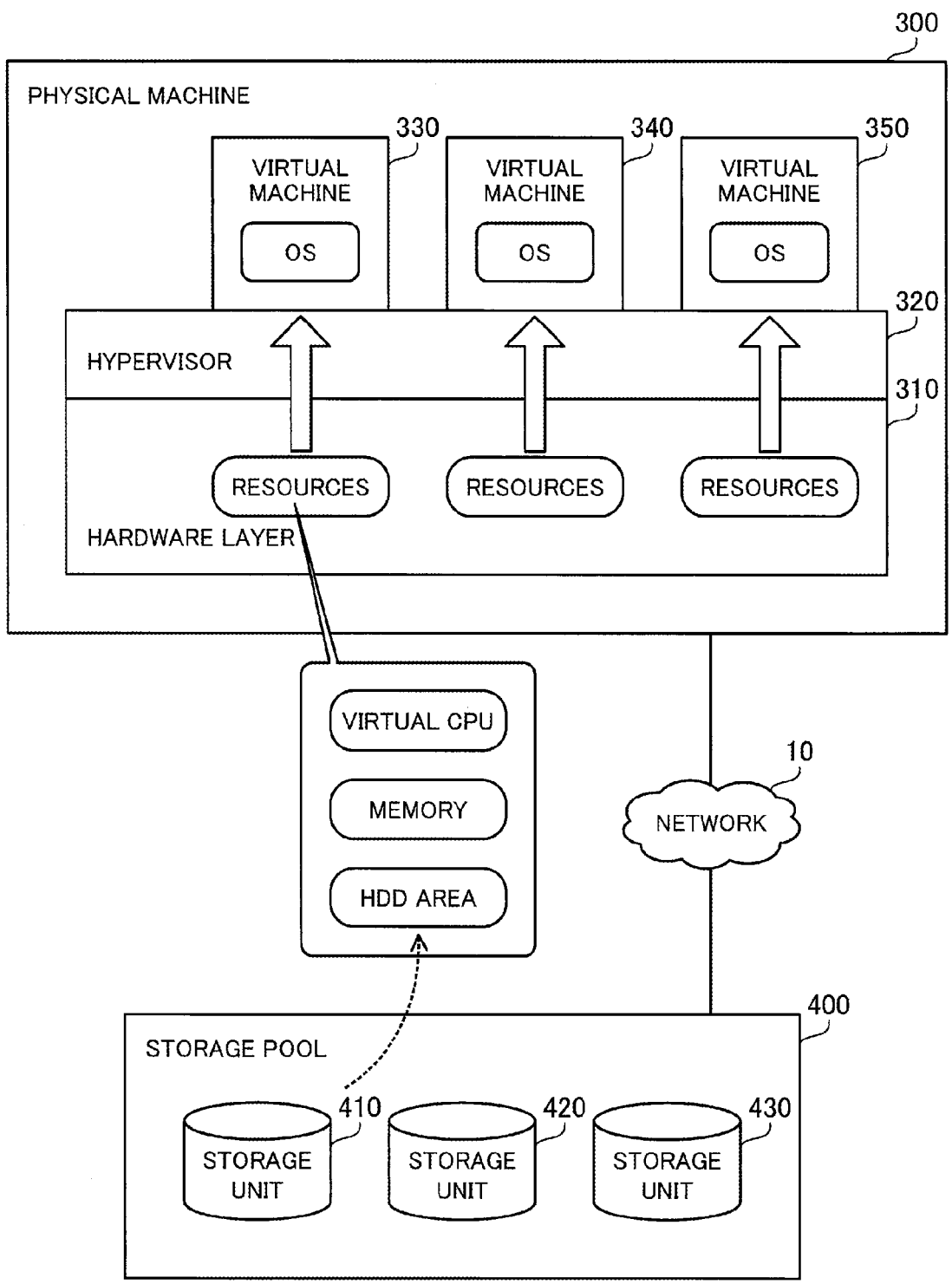
FIG. 4 illustrates an example of virtual machines.

FIG. 4 illustrates an example of virtual machines. The physical machine 300 includes a hardware layer 310, a hypervisor 320, and virtual machines 330, 340, and 350. The hardware layer 310 is a collection of physical resources including CPUs (which are sometimes referred to as "physical CPUs" in order to distinguish them from virtual CPUs described below), RAM, and communication interfaces provided in the physical machine 300. The hypervisor 320 runs virtual machines using resources in the hardware layer 310. The hypervisor 320 distributes the processing power of the physical CPUs and the storage area of the RAM to the virtual machines 330, 340, and 350 as resources for calculation. The hypervisor 320 arbitrates accesses to the hardware layer 310 from the virtual machines 330, 340, and 350 so that the virtual machines 330, 340, and 350 are able to share the resources of the hardware layer 310. The hypervisor 320 is sometimes referred to as the "virtual machine monitor (VMM)".

Note here that a unit of processing power of the physical CPUs distributed by the hypervisor 320 to each virtual machine is sometimes referred to as the "virtual CPU". Virtual CPUs may be associated with time slices obtained by dividing the period of time during which the physical CPUs are available for use into a plurality of time slices. For example, one virtual CPU corresponds to a time slice periodically allocated to a virtual machine (a duration of time periodically allocated to the virtual machine) for its processing during the time when the physical CPUs are available. The hypervisor 320 executes processing of each virtual machine in turn using an individual virtual CPU allocated to the virtual machine. Note that a plurality of time slices may be associated with a single virtual CPU.

The assigned amount of virtual CPUs is represented by the number of virtual CPUs. For example, when the virtual machine 330 is assigned one time slice, the number of virtual CPUs allocated to the virtual machine 330 is 1. When the virtual machine 330 is assigned two time slices, the number of virtual CPUs allocated to the virtual machine 330 is 2.

The clock frequency per virtual CPU on a physical machine is obtained by dividing the sum of clock frequencies of the physical CPUs (=clock frequency×the number of cores of the physical CPUs×the number of physical CPUs) by the sum of the number of virtual CPUs on the physical machine. For example, in the case where sixteen virtual CPUs are run on a physical machine with two physical CPUs each containing four cores operating at a clock frequency of 3 GHz, the clock frequency per virtual CPU is calculated as follows: (3 GHz×4×2)/16=1.5 GHz.

The hypervisor 320 logically divides the storage area (memory area) of the RAM of the physical machine 300 and assigns the divided storage areas to the virtual machines 330, 340, and 350. The assigned amount of the RAM is expressed by the size of the assigned memory area in giga bytes (GB). The hypervisor 320 logically divides the storage area (HDD area) of a plurality of storage units in the storage pool 400 and assigns the divided storage areas to the virtual machines 330, 340, and 350. The assigned amount of the storage units is expressed by the size of the assigned HDD area in GB. Note here that the storage pool 400 includes storage units 410, 420, and 430. For example, the hypervisor 320 assigns a part of the HDD area of the storage unit 410 to the virtual machine 330.

The virtual machines 330, 340, and 350 each independently run an operating system using the resources allocated thereto. The virtual machines 330, 340, and 350 may run the same operating system, or may run different operating systems from each other.

Note that the physical machines 300a and 300b run virtual machines in the same manner. In addition, assume in the following description that hardware (physical CPUs and memory allocatable to the virtual machines) of each of the physical machines 300, 300a, and 300b provides the same performance. Note however that the hardware of each of the physical machines 300, 300a, and 300b may provide different performance.

Figure 5:
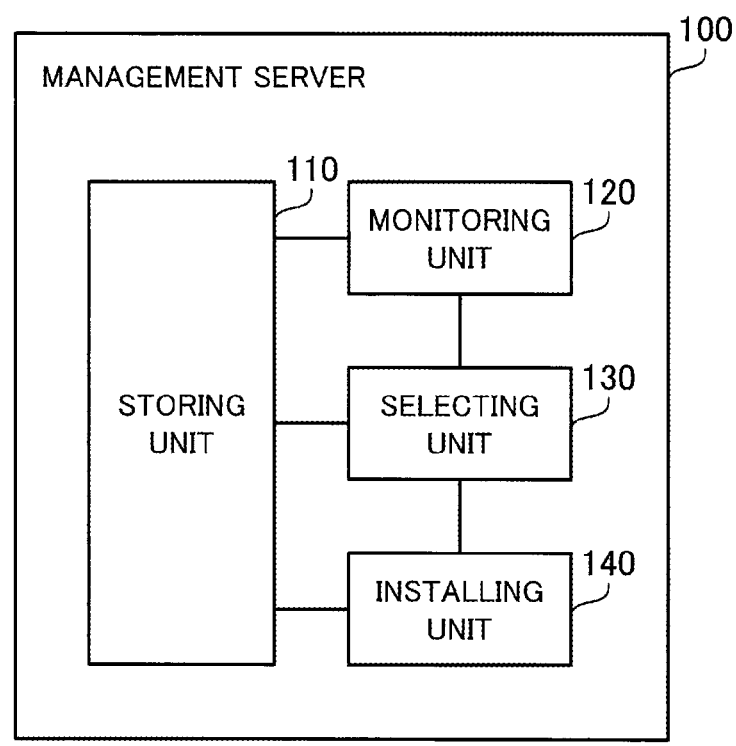
FIG. 5 illustrates an example of functions of the management server.

FIG. 5 illustrates an example of functions of a management server. The management server 100 includes a storing unit 110, a monitoring unit 120, a selecting unit 130, and an installing unit 140. The storing unit 110 is implemented using the storage area of the RAM 102 or the HDD 103. The monitoring unit 120, the selecting unit 130, and the installing unit 140 are implemented, for example, by the processor 101 executing a program stored in the RAM 102.

The storing unit 110 stores management information of the physical machines 300, 300a, and 300b and a plurality of virtual machines deployed on the physical machines 300, 300a, and 300b. The management information includes information indicating the allocation state of virtual machines to the physical machines 300, 300a, and 300b and the allocation state of the storage units to the virtual machines. The management information also includes information indicating the workloads on the physical machines 300, 300a, and 300b, information indicating the workloads on the storage units, and information indicating the workload on each virtual machine.

The storing unit 110 stores therein information about the use form of each virtual machine. The use form information includes, for example, the number of virtual CPUs assigned to each virtual machine, the clock frequency of the virtual CPUs, the memory capacity, the HDD capacity (disk capacity), the number of networks connected thereto, information about software such as an operating system and middleware (MW) used.

The monitoring unit 120 periodically acquires information about the workloads on the physical machines 300, 300a, and 300b, each virtual machine, and the storage units from the virtualization management server 200, and stores the acquired information in the storing unit 110. Instead, the monitoring unit 120 may acquire the workload information associated with the physical machines 300, 300a, and 300b, each virtual machine, and the storage units directly from the physical machines 300, 300a, 300b, and the storage pool 400.

The selecting unit 130 receives a request to install a new virtual machine from the client 21 or 22. The installation request includes information about the use form of the new virtual machine. Based on the received installation request and the use form information associated with each virtual machine, stored in the storing unit 110, the selecting unit 130 selects at least one existing virtual machine with a similar use form to that of the new virtual machine.

The selecting unit 130 acquires the past workload information of the selected existing virtual machine from the storing unit 110. Using the acquired workload information, the selecting unit 130 predicts the workload on each physical machine being an installation-target option for the new virtual machine for a predetermined period in the future. As the predetermined period (the prediction period), a period of time may be considered appropriate over which periodic features of the workloads on virtual machines are likely to be observed (for example, one week or one month). For example, in the system, if the workloads on virtual machines tend to undergo changes in a one-week period, the prediction period may be set as one week. If the workloads on virtual machines tend to undergo changes in a one-month period, the prediction period may be set as one month.

Based on prediction results for the future workload on each physical machine, the selecting unit 130 determines an installation-target physical machine for the new virtual machine. Specifically, the selecting unit 130 determines a physical machine whose predicted workload does not exceed a predetermined threshold over the prediction period as the installation-target physical machine for the new virtual machine.

The installing unit 140 installs the new virtual machine on the installation-target physical machine determined by the selecting unit 130. Specifically, the installing unit 140 instructs the hypervisor of the determined physical machine to run the new virtual machine. In response, the hypervisor of the physical machine starts running the new virtual machine.

FIG. 6 illustrates an example of a physical machine management table. A physical machine management table 111 is stored in the storing unit 110, and includes columns of the following items: physical machine name; CPU usage; network (NW) usage; and running virtual machine name.

Each field of the physical machine name column contains the name (identification information) of a physical machine. Each field of the CPU usage column contains how much of physical CPUs in the corresponding physical machine is in use, measured in percentage. Each field of the network usage column contains the usage of communication interfaces in the corresponding physical machine. The usage of the communication interfaces is expressed in the amount of data exchanged per unit time, for example, in mega bytes per second (MB/s). Each field of the running virtual machine name column contains the names (identification information) of virtual machines running on the corresponding physical machine.

For example, in the physical machine management table 111, an entry is registered with "SV1" in the physical machine name column; "80%" in the CPU usage column; "550 MB/s" in the network usage column; and "userA-vm1, userB-vm1, userC-vm1" in the running virtual machine name column. This entry indicates that the physical CPU usage and the communication interface usage of a physical machine identified by the physical machine name "SV1" are 80% and 550 MB/s, respectively. In addition, the entry also indicates that three virtual machines identified by the virtual machine names "userA-vm1, userB-vm1, userC-vm1" are running on the physical machine.

Note here that "SV1" is the physical machine name of the physical machine 300; "SV2" is the physical machine name of the physical machine 300a; "SV3" is the physical machine name of the physical machine 300b; "userA-vm1" is the virtual machine name of the virtual machine 330; "userB-vm1" is the virtual machine name of the virtual machine 340; and "userC-vm1" is the virtual machine name of the virtual machine 350.

FIG. 7 illustrates an example of a storage unit management table. A storage unit management table 112 is stored in the storing unit 110, and includes columns of the following items: storage unit name; storage access rate; and storage-using virtual machine name.

Each field of the storage unit name column contains the name (identification information) of a storage unit. Each field of the storage access rate column contains the sum of the amount of read data and the amount of written data per unit time associated with the corresponding storage unit. The storage access rate is expressed, for example, in MB/s. Each field of the storage-using virtual machine name column contains the names (identification information) of virtual machines using the corresponding storage unit.

For example, in the storage unit management table 112, an entry is registered with "STG1" in the storage unit name column; "300 MB/s" in the storage access rate column; and "userA-vm1, userB-vm1, userC-vm1, userD-vm1" in the storage-using virtual machine name column. This entry indicates that the storage access rate of a storage unit identified by the storage unit name "STG1" is 300 MB/s. In addition, the entry also indicates that four virtual machines identified by the virtual machine names "userA-vm1, userB-vm1, userC-vm1, userD-vm1" are using the storage unit.

Note here that "STG1" is the storage unit name of the storage unit 410; "STG2" is the storage unit name of the storage unit 420; and "STG3" is the storage unit name of the storage unit 430.

Figure 8:
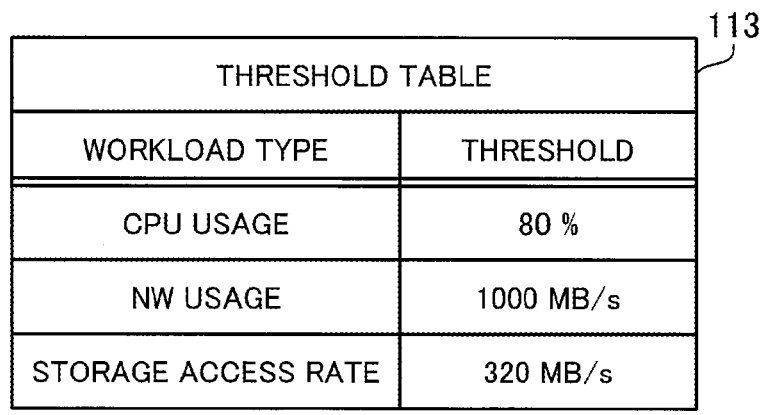
FIG. 8 illustrates an example of a threshold table.

FIG. 8 illustrates an example of a threshold table. A threshold table 113 is stored in the storing unit 110, and includes columns of workload type and threshold. Each field of the workload type column contains the information indicating the type of workload to be measured. Each field of the threshold column contains the threshold of the corresponding workload type.

For example, an entry with "CPU usage" in the workload type column and "80%" in the threshold column is registered in the threshold table 113. This entry indicates that, for an individual physical machine, the threshold of physical CPU usage is 80%. That is, the physical CPU usage of one physical machine being less than 80% is acceptable, but the physical CPU usage being equal to or more than 80% falls outside the acceptable range as exceeding the upper limit.

In addition, in the threshold table 113, an entry is registered with "network usage" in the workload type column and "1000 MB/s" in the threshold column. This entry indicates that, for an individual physical machine, the threshold of communication interface usage is 1000 MB/s. That is, the communication interface usage of one physical machine being less than 1000 MB/s is acceptable, but the communication interface usage being equal to or more than 1000 MB/s falls outside the acceptable range as exceeding the upper limit.

Further, in the threshold table 113, an entry is registered with "storage access rate" in the workload type column and "320 MB/s" in the threshold column. This entry indicates that, for an individual storage unit, the threshold of access rate is 320 MB/s. That is, the access rate for one storage unit being less than 320 MB/s is acceptable, but the access rate being equal to or more than 320 MB/s falls outside the acceptable range as exceeding the upper limit.

FIG. 9 illustrates an example of a virtual machine management table. A virtual machine management table 114 is stored in the storing unit 110, and includes columns of the following items: tenant name; virtual machine name; virtual machine type; and created date and time.

Each field of the tenant name column contains the name (identification information) of a tenant using a corresponding virtual machine. Each field of the virtual machine name column contains the identification information of the corresponding virtual machine. Each field of the virtual machine type column contains the information indicating the usage form type (virtual machine type) of the corresponding virtual machine. Each virtual machine type contains information about, for example, the following items: the number of virtual CPUs; the clock frequency of the virtual CPUs; the memory capacity; and the disk capacity. Each field of the created date and time column contains the date and time when the corresponding virtual machine was created (the date and time when the virtual machine started being used).

For example, in the virtual machine management table 114, an entry is registered with "userA" in the tenant name column; "userA-vm1" in the virtual machine name column; "image-a" in the virtual machine type column; and "2014/06/01 0:00" in the created date and time column. This entry indicates that the virtual machine 330 identified by the virtual machine name "userA-vm1" is in use by a tenant identified by the tenant name "userA", and the virtual machine type of the virtual machine 330 is a virtual machine type identified by "image-a". In addition, the entry also indicates that the virtual machine 330 is created at 0:00 on Jun. 1, 2014.

FIG. 10 illustrates an example of a workload history table. A workload history table 115 is one of a plurality of workload history tables stored in the storing unit 110, and corresponds to a virtual machine identified by the virtual machine name "userA-vm1". The storing unit 110 also stores therein workload history tables of other virtual machines, and the workload history tables stored in the storing unit 110 are specific to individual virtual machines. The workload history table 115 includes columns of the following items: date; time; CPU usage; network usage; and storage access rate.

Each field of the date column contains the date on which the workload on the corresponding virtual machine was acquired. Each field of the time column contains the time at which the workload was acquired. Each field of the CPU usage column contains how much of physical CPUs is in use by the virtual machine, measured in percentage. Each field of the network usage column contains the usage of the communication network by the virtual machine. Each field of the storage access rate column contains the storage access rate of the virtual machine.

For example, in the workload history table 115, an entry is registered with "2014/7/1" in the date column; "00:00:00" in the time column, "20%" in the CPU usage column; "60 MB/s" in the network usage column; and "30 MB/s" in the storage access rate column. This entry indicates that the virtual machine 330 identified by the virtual machine name "userA-vm1" was using 20% of the physical CPUs at 00:00:00 on Jul. 1, 2014. In addition, the entry also indicates that, at the time, the virtual machine 330 was transmitting and receiving data at a transfer rate of 60 MB/s via the communication interfaces of the physical machine 300, and was accessing data in the storage unit 410 at 30 MB/s.

FIG. 11 is an example of a virtual machine type table. A virtual machine type table 116 is stored in the storing unit 110, and includes columns of the following items: virtual machine type; specifications; operating system; middleware; and workload distribution.

Each field of the virtual machine type column contains a virtual machine type. The specifications column contains information about, for example, virtual machines and storage units used by the virtual machines. Specifically, the following items are registered as the specifications: number of virtual CPUs; clock frequency; memory capacity; disk capacity; and number of connected networks. The number of virtual CPUs indicates the number of virtual CPUs assigned to a corresponding virtual machine. The clock frequency indicates the operating frequency of each of the virtual CPUs. The memory capacity indicates the amount of RAM assigned to the corresponding virtual machine. The disk capacity indicates the amount of storage area within a storage unit, assigned to the corresponding virtual machine. The number of connected networks indicates the number of networks to which the corresponding virtual machine is connected.

Each field of the operating system column contains the type (or the name) of an operating system used on the corresponding virtual machine. Each field of the middleware column contains the type (or the name) of middleware used by the corresponding virtual machine. Each field of the workload distribution contains the status of utilizing a workload distribution structure.

For example, in the virtual machine type table 116, an entry is registered with "image-a" in the virtual machine type column; "2" in the number of virtual CPUs column; "2 GHz" in the clock frequency column; "2 GB" in the memory capacity column; "50 GB" in the disk capacity column; "2" in the number of connected networks column; "OS-W" in the operating system column; "MW1" in the middleware column; and use in the workload distribution column. This entry means that a virtual machine with the virtual machine type "image-a" is assigned a memory capacity of 2 GB, a disk capacity of 50 GB, and two virtual CPUs each having a clock frequency of 2 GHz, and is connected to two networks. In addition, the entry also indicates that the virtual machine runs OS-W as its operating system and uses MW1 as its middleware, and utilizes a workload distribution structure.

The virtual machine specifications, the used operating system, the used middleware, and the status of utilizing a workload distribution structure are cited as examples of items identified by each virtual machine type; however, in place of, or in addition to, the exemplified items, other items may be made identifiable. For example, in which one of the Web, application, and database tiers in a system built on a three tier Web architecture the corresponding virtual machine is used may be identified by each virtual machine type. In addition, the status of utilizing a redundant firewall configuration may be identified by each virtual machine type.

Next described are specific processing procedures carried out by the management server 100. In the following description, a new virtual machine and an existing virtual machine are sometimes denoted as "new VM" and "existing VM", respectively (especially in drawings).

Figure 12:
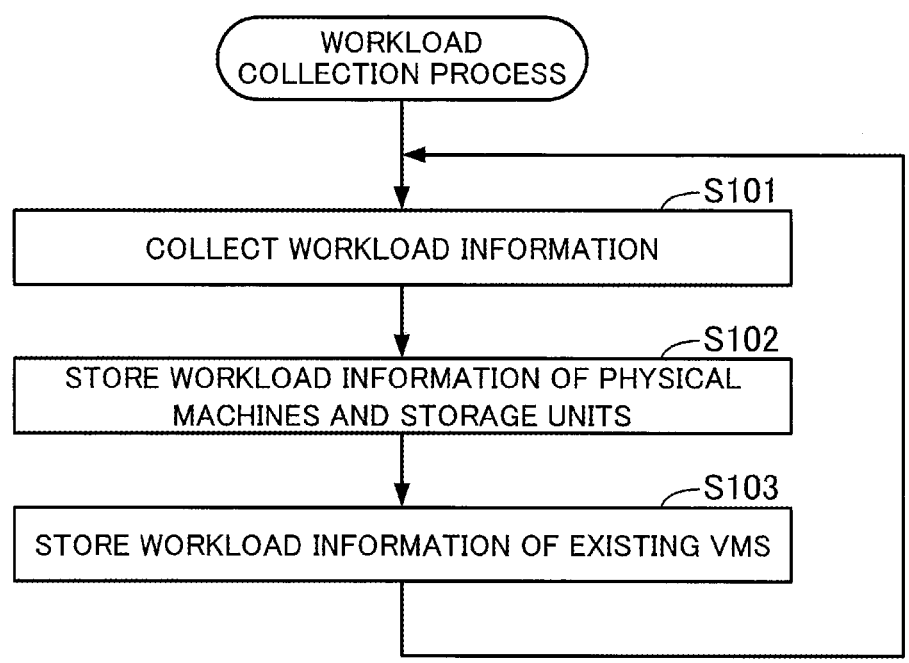
FIG. 12 is a flowchart illustrating an example of a workload collection process.

FIG. 12 is a flowchart illustrating an example of a workload collection process. The process of FIG. 12 is described next according to the step numbers in the flowchart.

[Step S101] The monitoring unit 120 collects the workload information (i.e., the physical CPU usage and the network usage) of each of the physical machines 300, 300a, and 300b at scheduled times (with a period of, for example, 10 seconds, 30 seconds, or 1 minute). The monitoring unit 120 collects the workload information (the storage access rate) of each of the storage units 410, 420, and 430. The monitoring unit 120 collects the workload information (the physical CPU usage, the network usage, and the storage access rate) of each of a plurality of existing virtual machines. The monitoring unit 120 acquires the workload information via the virtualization management server 200, or directly from the physical machines 300, 300a, and 300b and the storage pool 400.

[Step S102] The monitoring unit 120 stores the workload information of the physical machine 300, 300a, and 300b in the physical machine management table 111 (by overwriting registered values in the CPU usage column and the network usage column). The monitoring unit 120 stores the workload information of the storage units 410, 420, and 430 in the storage unit management table 112 (by overwriting registered values in the storage access rate column).

[Step S103] The monitoring unit 120 stores the workload information of each existing virtual machine in a corresponding workload history table specific to the existing virtual machine. For example, the workload on a virtual machine identified by the virtual machine name "userA-vm1" is stored in the workload history table 115 in association with the time at which the workload is collected. Then, the monitoring unit 120 proceeds to step S101 (i.e., waits for the next scheduled collecting time).

In the above-described manner, the management server 100 periodically collects the workload information of individual existing virtual machines and stores the collected workload information, to thereby manage the workload history information of the existing virtual machines. Upon receiving a request to install a new virtual machine, the management server 100 predicts the future workload on each physical machine being an installation-target option for the new virtual machine using the workload history information of the individual existing virtual machines. Then, based on the prediction results, the management server 100 determines a physical machine on which the new virtual machine is to be installed.

Figure 13:
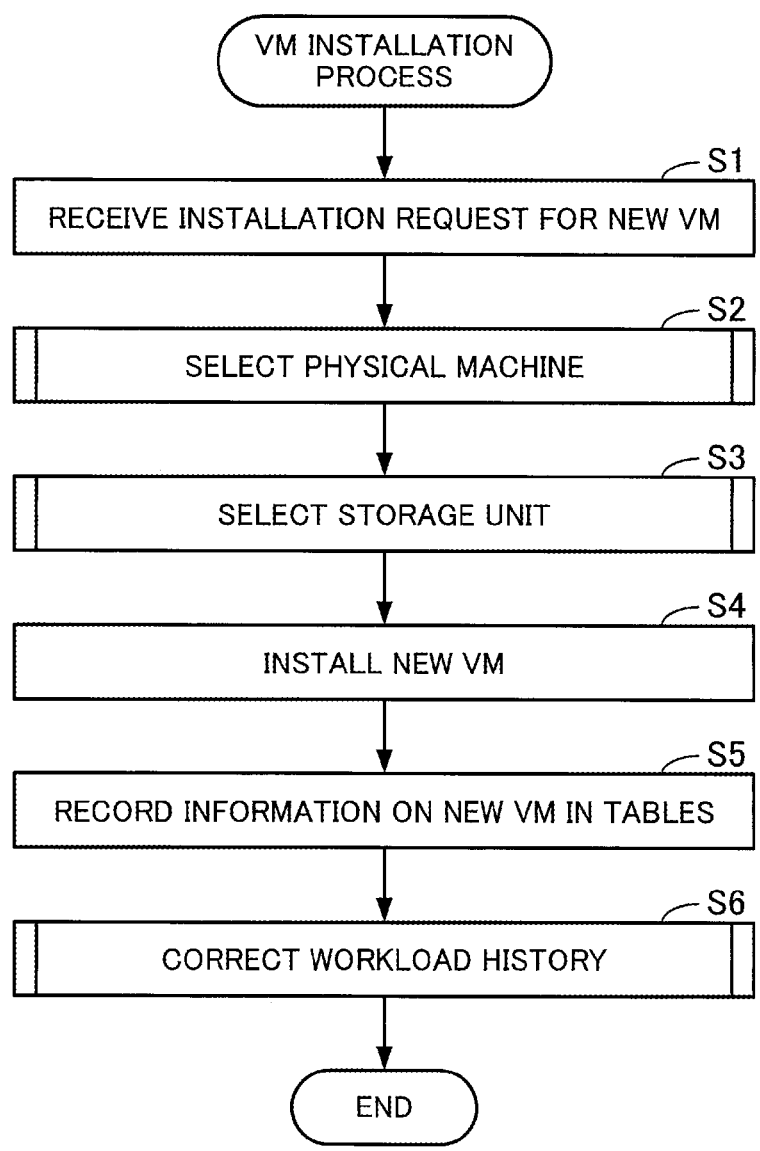
FIG. 13 is a flowchart illustrating an example of a virtual machine installation process.

FIG. 13 is a flowchart illustrating an example of a virtual machine installation process. The process of FIG. 13 is described next according to the step numbers in the flowchart.

[Step S1] The selecting unit 130 receives an installation request for a new virtual machine from the client 21. The installation request includes information on the virtual machine type of the new virtual machine.

[Step S2] The selecting unit 130 selects, amongst a plurality of physical machines, a physical machine on which the new virtual machine is to be installed. The physical machine selection process is described in detail later.

[Step S3] The selecting unit 130 selects, amongst a plurality of storage units, a storage unit to be assigned to the new virtual machine. The storage selection process is described in detail later.

[Step S4] The installing unit 140 installs the new virtual machine on the physical machine selected by the selecting unit 130. Specifically, the installing unit 140 instructs a hypervisor running on the physical machine to start running the new virtual machine. In response to the instruction from the installing unit 140, the hypervisor running on the physical machine starts running the new virtual machine. In this regard, the installing unit 140 assigns the storage unit selected by the selecting unit 130 to the new virtual machine.

[Step S5] The installing unit 140 records information on the new virtual machine in each table. Specifically, the installing unit 140 adds the virtual machine name of the new virtual machine, within the physical machine management table 111, to a field in the running virtual machine name column, corresponding to the installation-target physical machine. In addition, the installing unit 140 adds the virtual machine name of the new virtual machine, within the storage unit management table 112, to a field in the storage-using virtual machine name column, corresponding to the storage unit assigned to the new virtual machine. Further, the installing unit 140 adds an entry for the new virtual machine to the virtual machine management table 114. Note that, in order to store workload history information of the new virtual machine, the monitoring unit 120 newly creates a workload history table for the new virtual machine and stores the created workload history table in the storing unit 110, and then starts recording the workload on the new virtual machine.

[Step S6] According to the selection of the physical machine made in step S2, the selecting unit 130 corrects each workload value in corresponding existing virtual machine-specific workload history tables. The workload history correction process is described in detail later.

Figure 14:
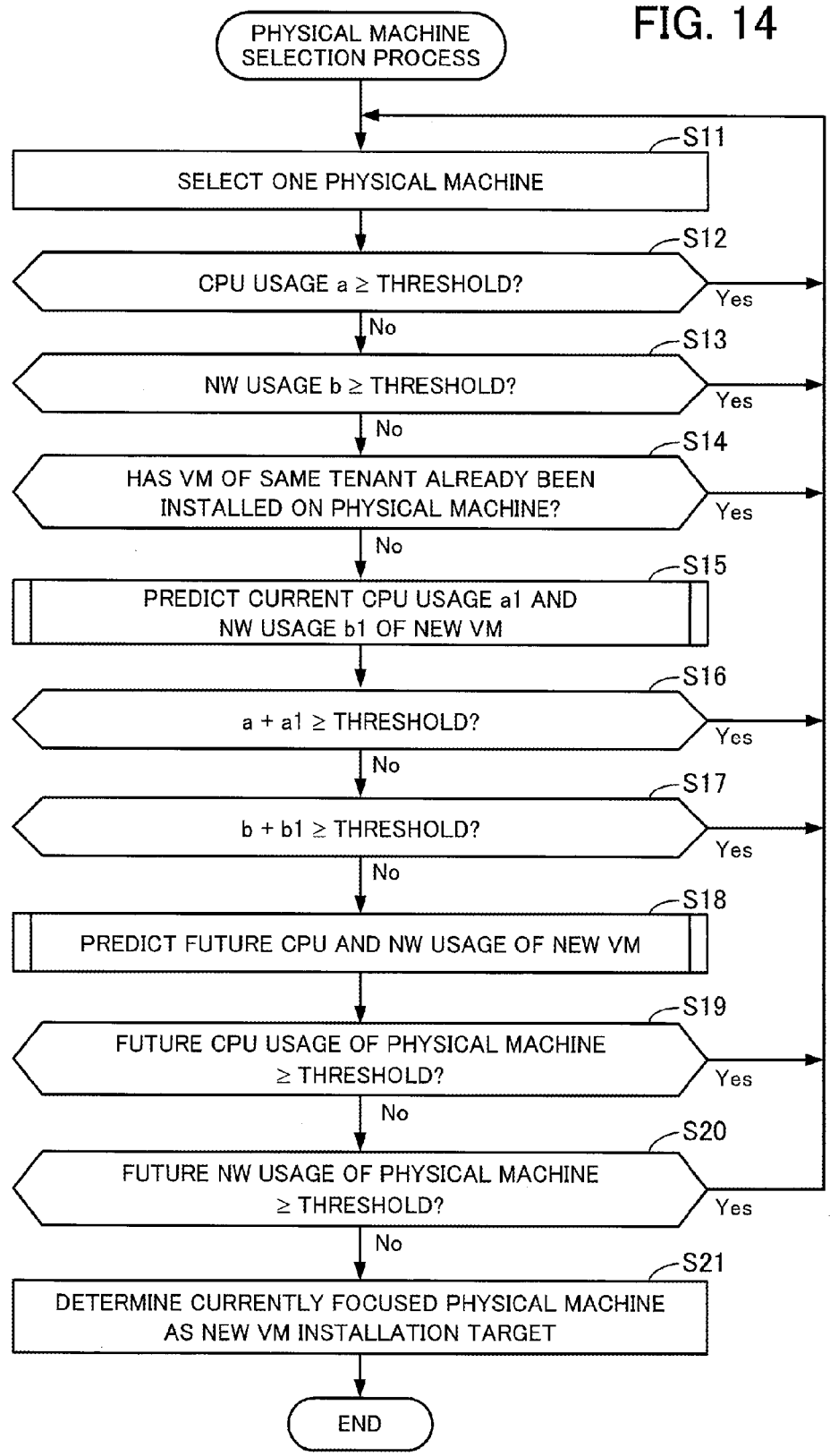
FIG. 14 is a flowchart illustrating an example of a physical machine selection process.

FIG. 14 is a flowchart illustrating an example of the physical machine selection process. The process of FIG. 14 is described next according to the step numbers in the flowchart. The procedures of FIG. 14 correspond to step S2 of FIG. 13.

[Step S11] The selecting unit 130 selects one physical machine amongst the physical machines 300, 300a, and 300b. Note that the selecting unit 130 excludes one or more physical machines having already undergone the procedures of step S12 and the subsequent steps from the selection targets.

[Step S12] Referring to the physical machine management table 111, the selecting unit 130 acquires CPU usage a of the selected physical machine. The selecting unit 130 determines whether the CPU usage a is equal to or more than the CPU usage threshold registered in the threshold table 113. If the CPU usage a is equal to or more than the threshold, the selecting unit 130 proceeds to step S11. If the CPU usage a is below the threshold, the selecting unit 130 proceeds to step S13. Note here that, in the threshold table 113, "80%" is registered as the threshold of the CPU usage. For example, assume that the physical machine 300 is selected in step S11. According to the physical machine management table 111, the CPU usage a of the physical machine 300 is 80%. In this case, the selecting unit 130 determines that the CPU usage a being 80% is equal to or more than the threshold, 80%. Assume, alternatively, that the physical machine 300a is selected in step S11. According to the physical machine management table 111, the CPU usage a of the physical machine 300a is 50%. In this case, the selecting unit 130 determines that the CPU usage a being 50% is below the threshold, 80%.

[Step S13] Referring to the physical machine management table 111, the selecting unit 130 acquires network usage b of the selected physical machine. The selecting unit 130 determines whether the network usage b is equal to or more than the network usage threshold registered in the threshold table 113. If the network usage b is equal to or more than the threshold, the selecting unit 130 proceeds to step S11. If the network usage b is below the threshold, the selecting unit 130 proceeds to step S14. Note here that, in the threshold table 113, "1000 MB/s" is registered as the threshold of the network usage. For example, according to the physical machine management table 111, the network usage b of the physical machine 300a is 420 MB/s. In this case, the selecting unit 130 determines that the network usage b being 420 MB/s is below the threshold, 1000 MB/s.

[Step S14] Referring to the physical machine management table 111 and the virtual machine management table 114, the selecting unit 130 determines whether a different virtual machine (an existing virtual machine) of the tenant having made the installation request for the new virtual machine has already been installed on the currently focused physical machine. If such a different virtual machine has already been installed, the selecting unit 130 proceeds to step S11. If not, the selecting unit 130 proceeds to step S15. For example, the selecting unit 130 refers to the physical machine management table 111 to thereby acquire names of virtual machines running on the physical machine. Then, the selecting unit 130 refers to the virtual machine management table 114 to thereby acquire tenant names each corresponding to one of the acquired virtual machine names. The selecting unit 130 determines whether the tenant name of the requestor of the new virtual machine installation is included in the acquired tenant names. Herewith, the determination of step S14 is implemented. In the case where the tenant name is included, a different virtual machine of the requestor of the new virtual machine installation has already been installed on the physical machine. On the other hand, if the tenant name is not included, a different virtual machine of the tenant having made the installation request has yet to be installed on the physical machine.

[Step S15] The selecting unit 130 selects one or more existing virtual machines with similar use forms to that of the new virtual machine, and predicts current CPU usage a1 and network usage b1 of the new virtual machine using the workload information of the selected existing virtual machines. In this regard, the predictive value of the current CPU usage of the new virtual machine may be considered as a predictive value of the CPU usage obtained on the assumption that the new virtual machine is currently running on a physical machine. Similarly, the predictive value of the current network usage of the new virtual machine may be considered as a predictive value of the network usage obtained on the assumption that the new virtual machine is currently running on a physical machine.

[Step S16] The selecting unit 130 determines whether the sum of the CPU usage a used in the determination of step S12 and the CPU usage a1 predicted in step S15, a+a1, is equal to or more than the threshold of the CPU usage registered in the threshold table 113. If the sum is equal to or more than the threshold, the selecting unit 130 proceeds to step S11. If the sum is below the threshold, the selecting unit 130 proceeds to step S17.

[Step S17] The selecting unit 130 determines whether the sum of the network usage b used in the determination of step S13 and the network usage b1 predicted in step S15, b+b1, is equal to or more than the threshold of the network usage registered in the threshold table 113. If the sum is equal to or more than the threshold, the selecting unit 130 proceeds to step S11. If the sum is below the threshold, the selecting unit 130 proceeds to step S18.

[Step S18] The selecting unit 130 selects one or more existing virtual machines with similar use forms to that of the new virtual machine, and uses the past workload history information of the selected existing virtual machines to thereby predict the future CPU usage and network usage of the new virtual machine. The prediction method is described in detail later.

[Step S19] According to the prediction results obtained in step S18, the selecting unit 130 determines whether the CPU usage of the currently focused physical machine reaches or exceeds the corresponding threshold registered in the threshold table 113 at any point in time in the future. If the CPU usage reaches or exceeds the threshold, the selecting unit 130 proceeds to step S11. If the CPU usage remains below the threshold, the selecting unit 130 proceeds to step S20.

[Step S20] According to the prediction results obtained in step S18, the selecting unit 130 determines whether the network usage of the currently focused physical machine reaches or exceeds the corresponding threshold registered in the threshold table 113 at any point in time in the future. If the network usage reaches or exceeds the threshold, the selecting unit 130 proceeds to step S11. If the network usage remains below the threshold, the selecting unit 130 proceeds to step S21.

[Step S21] The selecting unit 130 determines the currently focused physical machine as the installation target for the new virtual machine. The selecting unit 130 informs the installing unit 140 of the determined result.

Figure 15:
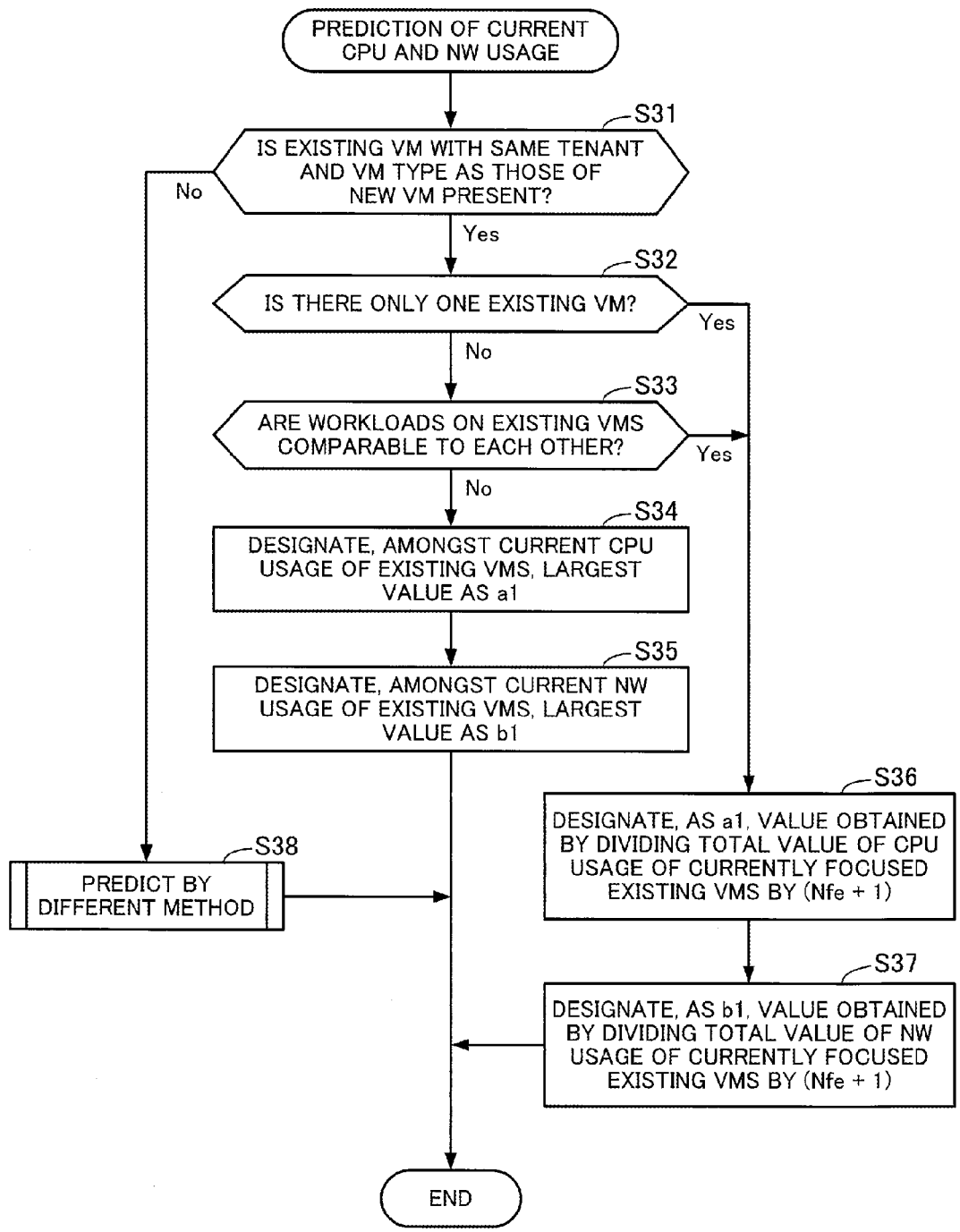
FIG. 15 is a flowchart illustrating an example of predicting current CPU and network usage.

FIG. 15 is a flowchart illustrating an example of predicting current CPU and network usage. The process of FIG. 15 is described next according to the step numbers in the flowchart. The procedures of FIG. 15 correspond to step S15 of FIG. 14.

[Step S31] Referring to the physical machine management table 111 and the virtual machine management table 114, the selecting unit 130 determines whether an existing virtual machine is present whose tenant and virtual machine type are the same as those of the new virtual machine. If such an existing virtual machine is present, the selecting unit 130 proceeds to step S32. If not, the selecting unit 130 proceeds to step S38. The selecting unit 130 determines that the virtual machine type of an existing virtual machine is the same as that of the new virtual machine if entries of all the items defined by the virtual machine type of the existing virtual machine are consistent with those defined by the virtual machine type of the new virtual machine. Alternatively, the selecting unit 130 may determine that they are the same virtual machine type if entries of some main items (for example, a combination of the specifications, operating system, and middleware, or a combination of the specifications and operating system) defined by the virtual machine type of the existing virtual machine are consistent with those defined by the virtual machine type of the new virtual machine.

[Step S32] The selecting unit 130 determines whether there is only one existing virtual machine whose tenant and virtual machine type are the same as those of the new virtual machine (i.e., currently focused existing virtual machine). If there is more than one such existing virtual machine, the selecting unit 130 proceeds to step S33. If there is only one such existing virtual machine, the selecting unit 130 proceeds to step S36.

[Step S33] The selecting unit 130 determines whether the current workloads on the currently focused existing virtual machines are comparable to each other. If they are not comparable, the selecting unit 130 proceeds to step S34. If they are comparable, the selecting unit 130 proceeds to step S36. Being "comparable" here means, for example, that the deviation (e.g. the variance or standard deviation) of the current workloads on the individual currently focused existing virtual machines is smaller than a predetermined value. The selecting unit 130 calculates the variance of each of the CPU usage and the network usage. Then, if each of the calculated variances is smaller than its predetermined value, the selecting unit 130 determines that the current workloads on the currently focused existing virtual machines are comparable to each other. If one of the variances of the CPU usage and the network usage is equal to or more than its predetermined value, the current workloads on the individual currently focused existing virtual machines are not comparable to each other. Note that in the case where two existing virtual machines whose tenant and virtual machine type are the same as those of the new virtual machine are present, differences in the workloads (the CPU usage and the network usage) between the two may be calculated in place of the variances. Then, when each of the differences is smaller than its predetermined value, the selecting unit 130 determines that the current workloads on the two currently focused existing virtual machines are comparable (if one of the differences is equal to or more than its predetermined value, the current workloads are not comparable to each other).

In this regard, in order to perform step S33, the monitoring unit 120 may acquire the current workload on each of the currently focused existing virtual machines from the virtualization management server 200 or the physical machines 300, 300a, and 300b and then provide it to the selecting unit 130. Alternatively, referring to the workload history tables of the individual currently focused existing virtual machines, stored in the storing unit 110, the selecting unit 130 performs step S33 by regarding the latest workload on each of the existing virtual machines as the current workload on the existing virtual machine. Note however that the former method is preferable in the light of making predictions using more recent workloads. In subsequent steps, the current workloads are acquired in the same manner.

[Step S34] The selecting unit 130 designates the largest value among the current CPU usage of the currently focused existing virtual machines as the current CPU usage a1 (predictive value) of the new virtual machine.

[Step S35] The selecting unit 130 designates the largest value among the network usage of the currently focused existing virtual machines as the current network usage b1 (predictive value) of the new virtual machine. Then, the selecting unit 130 ends the process.

[Step S36] The selecting unit 130 designates, as the current CPU usage a1 of the new virtual machine, a value obtained by dividing a total value of the current CPU usage of the currently focused existing virtual machine/s (the number of currently focused existing virtual machines may be one, or more than one) by ($N_{fe}$+1), where $N_{fe}$ is the number of currently focused existing virtual machines. When the number of currently focused existing virtual machines is one, the current CPU usage of the existing virtual machine is used as the total value.

[Step S37] The selecting unit 130 designates, as the current network usage b1 of the new virtual machine, a value obtained by dividing a total value of the current network usage of the currently focused existing virtual machine/s (the number of currently focused existing virtual machines may be one, or more than one) by ($N_{fe}$+1). When the number of currently focused existing virtual machines is one, the current network usage of the existing virtual machine is used as the total value. Subsequently, the selecting unit 130 ends the process.

[Step S38] The selecting unit 130 predicts the current workload on the new virtual machine using a different method. The different method is described in detail later.

Note that, in each of steps S34 and S35, the maximum workload amongst the current workloads on the individual existing virtual machines is designated as the predictive workload value of the new virtual machine. This is in order to prevent the predictive workload value of a physical machine on which the new virtual machine is to be installed from being underestimated. If the predictive workload value of the physical machine is underestimated, the physical machine may be put under an excessive workload during its actual operation. In view of this, when the workloads on the individual currently focused existing virtual machines vary considerably, the selecting unit 130 uses the maximum workload amongst the workloads on the existing virtual machines as the predictive workload value of the new virtual machine, which allows selection of an installation-target physical machine whose workload would not become excessively high.

In addition, in each of steps S36 and S37, the value obtained by dividing the total value of the current workloads of the currently focused existing virtual machine/s by ($N_{fe}$+1) is designated as the predictive current workload value of the new virtual machine. This is in order to further improve the accuracy of predicting the workload on the new virtual machine. That is, in the case where an existing virtual machine with the virtual machine type being the same as that of the new virtual machine is present, the new virtual machine is likely to be used for the same purpose as the existing virtual machine. Further, when there is only one such existing virtual machine, or when there is more than one such existing virtual machine and the workloads on the individual existing virtual machines vary little, the installation of the new virtual machine is likely to distribute the workload/s on the existing virtual machine/s across the new virtual machine and the existing virtual machine/s. Therefore, in these cases, the selecting unit 130 designates, as the predictive current workload value of the new virtual machine, a value obtained by dividing the total current workload value of the currently focused existing virtual machine/s by ($N_{fe}$+1).

Figure 16:
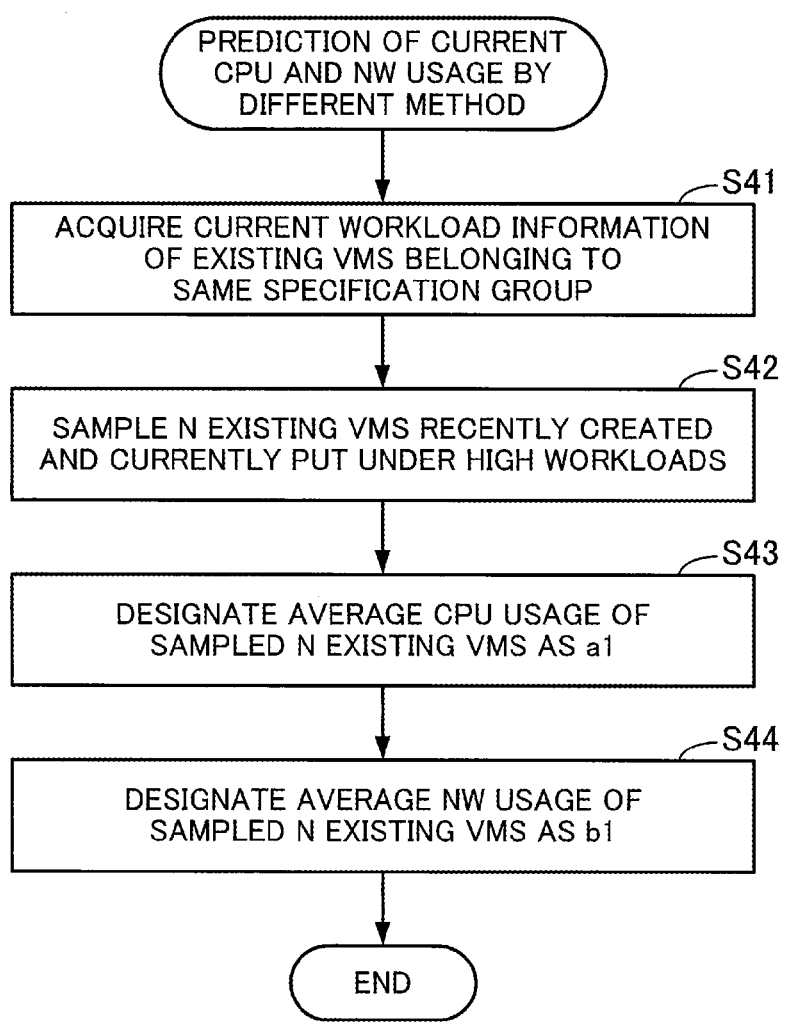
FIG. 16 is a flowchart illustrating an example of predicting the current CPU and network usage by a different method.

FIG. 16 is a flowchart illustrating an example of predicting the current CPU and network usage by a different method. The process of FIG. 16 is described next according to the step numbers in the flowchart. The procedures of FIG. 16 correspond to step S38 of FIG. 15.

[Step S41] The selecting unit 130 acquires the current workload information (i.e., the current CPU usage and network usage) of existing virtual machines belonging to the same specification group as the new virtual machine. Note here that specification groups are groups divided according to specifications of virtual machines. For example, three classifications of Low, Mid, and High are considered as specification groups. Low is a specification group including existing virtual machines with the clock frequency per virtual CPU being equal to or less than 1 GHz and the memory capacity being equal to or less than 2 GB (for example, in the case of selecting the clock frequency per virtual CPU being equal to or less than 1 GHz, existing virtual machines with the memory capacity exceeding 2 GB are excluded from the selection). Mid is a specification group including existing virtual machines with the clock frequency per virtual CPU exceeding 1 GHz and being less than 3 GHz and the memory capacity exceeding 2 GB and being less than 8 GB (for example, in the case of selecting existing virtual machines with the clock frequency per virtual CPU exceeding 1 GHz and being less than 3 GHz, existing virtual machines with the memory capacity being equal to or less than 2 GB or being equal to or more than 8 GB are excluded from the selection). High is a specification group including existing virtual machines with the clock frequency per virtual CPU being equal to or more than 3 GHz and the memory capacity being equal to or more than 8 GB (for example, in the case of selecting existing virtual machines with the clock frequency per virtual CPU being equal to or more than 3 GHz, existing virtual machines with the memory capacity being less than 8 GB are excluded from the selection). For example, if the new virtual machine has a clock frequency per virtual CPU of 2 GHz and a memory capacity of 4 GB, the new virtual machine belongs to the Mid-level specification group. In this case, the selecting unit 130 acquires the current workload information of a plurality of existing virtual machines belonging to the Mid-level specification group. The method for acquiring the current workload information is the same as the method illustrated in step S33 of FIG. 15.

[Step S42] Based on the workload information acquired in step S41 and the virtual machine management table 114, the selecting unit 130 samples N existing virtual machines (N is a positive integer) recently created and currently put under relatively high workloads. The value of N is stored in the storing unit 110 in advance (for example, N=10, 20, or 10% of the total number of the existing virtual machines). Here, for example, the CPU usage is used as the workload information. Alternatively, the workload on each existing virtual machine may be evaluated by taking into consideration both the CPU usage and the network usage of the existing virtual machine (for example, each of the CPU usage and the network usage of each existing virtual machine is converted to a workload index value by predetermined rules, and the sum of the two index values is used as the workload of the existing virtual machine).

[Step S43] The selecting unit 130 designates the average CPU usage of the sampled N existing virtual machines as the current CPU usage a1 of the new virtual machine.

[Step S44] The selecting unit 130 designates the average network usage of the sampled N existing virtual machines as the current network usage b1 of the new virtual machine.

Figure 17:
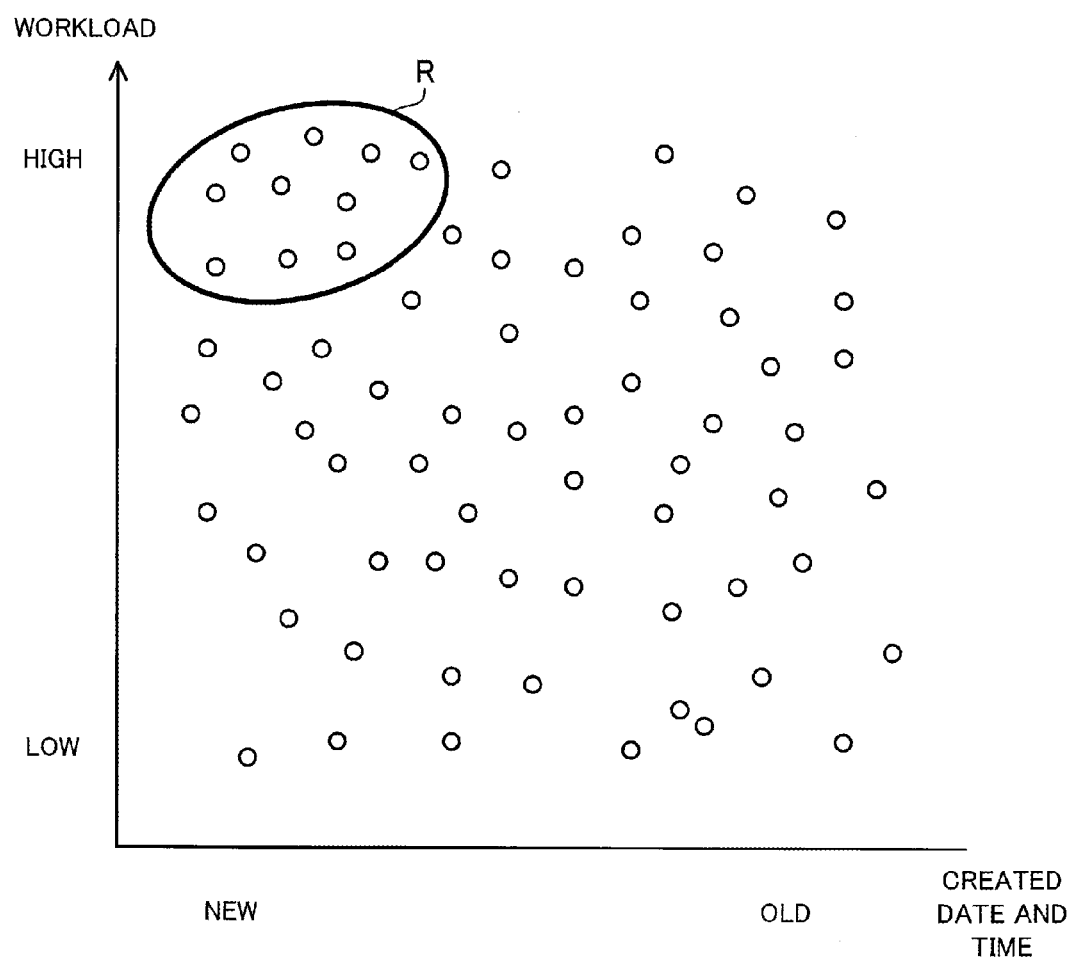
FIG. 17 illustrates an example of sampling existing virtual machines.

FIG. 17 illustrates an example of sampling existing virtual machines. For example, in the case where the new virtual machine belongs to the Mid-level specification group, the selecting unit 130 is able to obtain the distribution of individual existing virtual machines belonging to the Mid-level specification group in relation to the created date and time and the magnitude of the workload. The accuracy of predicting the workload on the new virtual machine is improved by using information about the workloads on existing virtual machines belonging to the same specification group as the new virtual machine.

In FIG. 17, the horizontal axis represents the created date and time and the vertical axis represents the magnitude of the workload. The shift toward the right side of the horizontal axis represents older created dates and times, and the shift toward the left side of the horizontal axis represents newer created dates and times. The shift toward the lower side of the vertical axis represents lower workloads, and the shift toward the upper side of the horizontal axis represents higher workloads. Each outlined circle plotted on a graph with these two axes represents one existing virtual machine belonging to a specification group (for example, the Mid-level specification group).

The selecting unit 130 samples, for example, ten existing virtual machines with newer created dates and times and relatively high workloads from the distribution of FIG. 17. A region R surrounds outlined circles corresponding to the ten existing virtual machines being sampling targets. For example, the selecting unit 130 sequentially extracts ten existing virtual machines with the latest created dates and times and the workload being equal to or more than a predetermined value.

Note here that even if existing virtual machines to be targeted are reduced by designating a target specification group, existing virtual machines belonging to the target specification group may still include those with excessive selection of specifications and those with a workload having passed its peak (existing virtual machines with old workload information). Using the workload information of such existing virtual machines may cause the workload on the new virtual machine to be relatively underestimated. In view of this, the selecting unit 130 samples existing virtual machines with newer created dates and times and relatively high workloads, to thereby prevent the workload on the new virtual machine from being underestimated. Herewith, it is possible to prevent the workload on a physical machine on which the new virtual machine is installed from being excessively high.

Note that the selecting unit 130 may sample only existing virtual machines whose tenant is the same as that of the new virtual machine. Alternatively, the selecting unit 130 may sample both existing virtual machines whose tenant is the same as that of the new virtual machine and existing virtual machines whose tenant is different from that of the new virtual machine.

Figure 18:
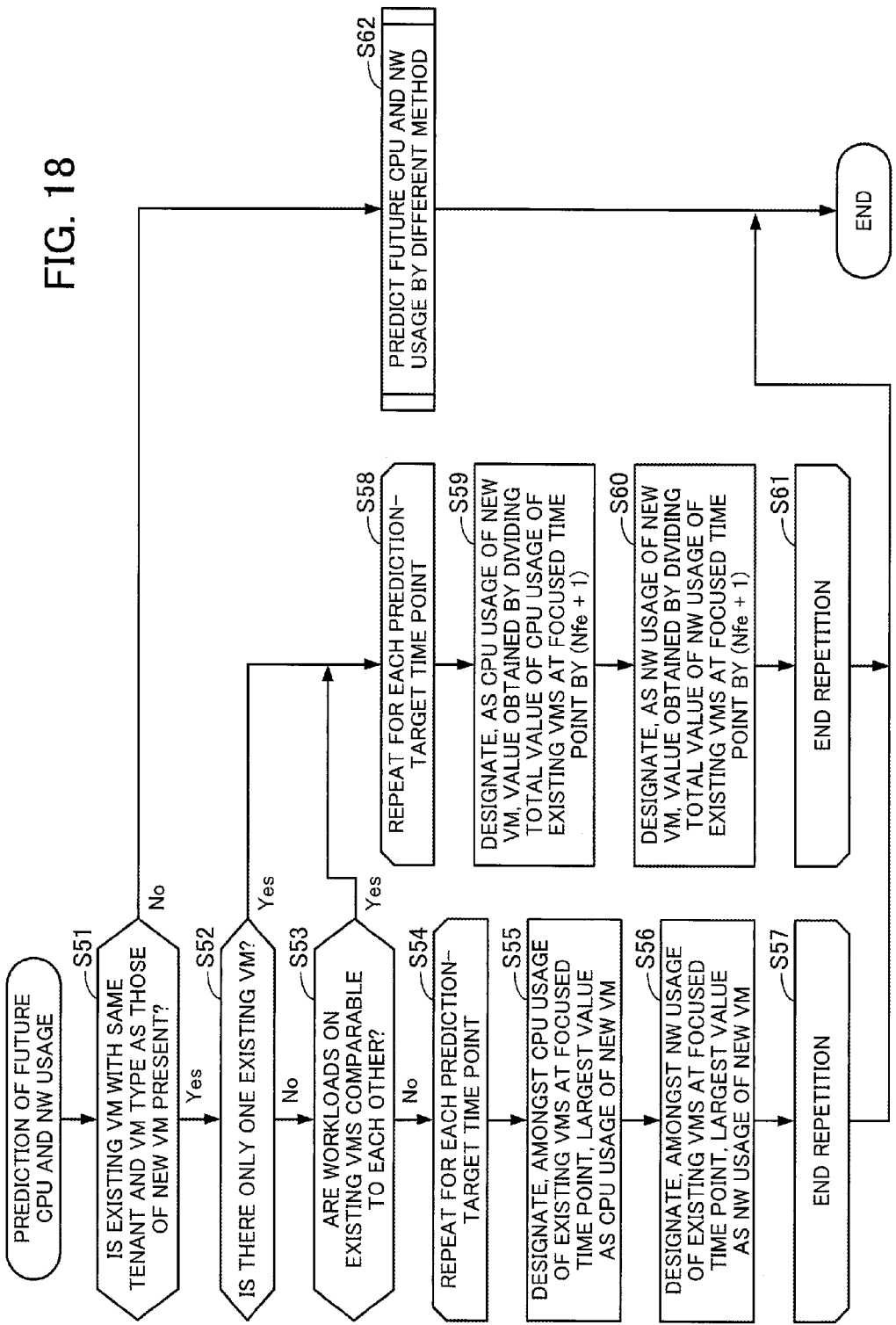
FIG. 18 is a flowchart illustrating an example of predicting future CPU and network usage.

FIG. 18 is a flowchart illustrating an example of predicting future CPU and network usage. The process of FIG. 18 is described next according to the step numbers in the flowchart. The procedures of FIG. 18 correspond to step S18 of FIG. 14.

[Step S51] Referring to the physical machine management table 111 and the virtual machine management table 114, the selecting unit 130 determines whether an existing virtual machine is present whose tenant and virtual machine type are the same as those of the new virtual machine. If such an existing virtual machine is present, the selecting unit 130 proceeds to step S52. If not, the selecting unit 130 proceeds to step S62. A specific determination method is the same as step S31.

[Step S52] The selecting unit 130 determines whether there is only one existing virtual machine whose tenant and virtual machine type are the same as those of the new virtual machine (i.e., currently focused existing virtual machine). If there is more than one such existing virtual machine, the selecting unit 130 proceeds to step S53. If there is only one such existing virtual machine, the selecting unit 130 proceeds to step S58. Note that, in steps S51 and S52, the selecting unit 130 may directly use the determination results of steps S31 and S32, respectively, to determine their destination steps.

[Step S53] The selecting unit 130 determines whether current workloads on the currently focused existing virtual machines are comparable to each other. If they are not comparable, the selecting unit 130 proceeds to step S54. If they are comparable, the selecting unit 130 proceeds to step S58. The selecting unit 130 may make the determination of step S53 based on the determination results of step S33 of FIG. 15. That is, when they have been determined to be comparable in step S33, they may also be determined to be comparable in step S53. When they have been determined not to be comparable in step S33, they may also be determined not to be comparable in step S53. Alternatively, the selecting unit 130 may determine whether the workloads on the currently focused existing virtual machines are comparable to each other (i.e., whether a workload variance, or a difference in the workloads between two existing virtual machines, is smaller than a predetermined value), not only at the current moment, but also at a plurality of points in the past (for example, every hour for the last five hours, or every 24 hours for the last 120 hours). Then, the selecting unit 130 may determine in step S53 that they are comparable when the workloads on the currently focused existing virtual machines are comparable to each other at all the points of time. On the other hand, the selecting unit 130 may determine in step S53 that they are not comparable when the workloads on the currently focused existing virtual machines are not comparable to each other at any of the points in time. Note that the past workload of each existing virtual machine is recorded in a corresponding workload history table stored in the storing unit 110.

[Step S54] The selecting unit 130 repeats steps S55 and S56 for each prediction-target time point. Note here that the prediction-target time points are a plurality of points in time, for example, spaced apart at predetermined time intervals (at the interval of every minute, 5 minutes, 10 minutes, or the like) from the current time. For example, in the case of the points in time spaced apart at the interval of every minute, the prediction-target time points are 1 minute, 2 minutes, 3 minutes, and . . . later than the current time. In the case of the points in time spaced apart at the interval of every 10 minutes, the prediction-target time points are 10 minutes, 20 minutes, 30 minutes, and . . . later than the current time. The end point of the prediction-target time points is, for example, 1 week or 1 month later than the current time (the time period from the current time to the end point is the prediction period).

The prediction-target time points may be associated with past time points registered in the workload history tables. For example, if the prediction period is 1 week, a prediction-target time point 1 minute later than the current time is associated with a time point 1 week before the time point 1 minute later than the current time. Similarly, a prediction-target time point 10 minutes later than the current time is associated with a time point 1 week before the time point 10 minutes later than the current time. In addition, if the prediction period is 1 month, the prediction-target time point 1 minute later than the current time is associated with a time point 1 month before the time point 1 minute later than the current time. Similarly, the prediction-target time point 10 minutes later than the current time is associated with a time point 1 month before the time point 10 minutes later than the current time. In the following description, past time points associated with the prediction-target time points are referred to as "focused time points". The selecting unit 130 identifies focused time points associated with the prediction-target time points and repeats the following steps S55 and S56 for each of the identified focused time points.

[Step S55] Referring to the workload history tables of the currently focused existing virtual machines, the selecting unit 130 designates the largest value among the CPU usage of the currently focused existing virtual machines at the focused time point as predictive CPU usage of the new virtual machine for a prediction-target time point associated with the focused time point.

[Step S56] Referring to the workload history tables of the currently focused existing virtual machines, the selecting unit 130 designates the largest value among the network usage of the currently focused existing virtual machines at the focused time point as predictive network usage of the new virtual machine for the corresponding prediction-target time point. Note that, in each of steps S55 and S56, the maximum workload amongst the workloads on the individual existing virtual machines at the focused time point is designated as the predictive workload value of the new virtual machine. The reason of this is the same as for steps S34 and S35 of FIG. 15, i.e., to prevent the predictive workload value of a physical machine on which the new virtual machine is to be installed from being underestimated.

[Step S57] After repeating steps S55 and S56 for all the prediction-target time points, the selecting unit 130 ends the process.

[Step S58] The selecting unit 130 repeats steps S59 and S60 for each prediction-target time point. The definition of the prediction-target time points is the same as that described in step S54 above. The selecting unit 130 identifies focused time points associated with the prediction-target time points and repeats the following steps S59 and S60 for each of the identified focused time points.

[Step S59] The selecting unit 130 designates, as predictive CPU usage of the new virtual machine for a prediction-target time point associated with the focused time point, a value obtained by dividing a total value of the CPU usage of the currently focused existing virtual machines at the focused time point by $(N_{fe}+1)$. When the number of currently focused existing virtual machines is one, the CPU usage of the existing virtual machine at the focused time point is used as the total value. The selecting unit 130 is able to acquire the CPU usage of each existing virtual machine at the focused time point from a workload history table corresponding to the existing virtual machine.

[Step S60] The selecting unit 130 designates, as predictive network usage of the new virtual machine for the corresponding prediction-target time point, a value obtained by dividing a total value of the network usage of the currently focused existing virtual machines at the focused time point by $(N_{fe}+1)$. When the number of currently focused existing virtual machines is one, the network usage of the existing virtual machine at the focused time point is used as the total value. The selecting unit 130 is able to acquire the network usage of each existing virtual machine at the focused time point from a workload history table corresponding to the existing virtual machine.

Note that, in each of steps S59 and S60, the value obtained by dividing the total value of the workloads of the currently focused existing virtual machines at each focused time point by $(N_{fe}+1)$ is designated as the predictive workload value of the new virtual machine for a prediction-target time point associated with the focused time point. The reason of this is the same as for steps S36 and S37 of FIG. 15, i.e., to improve the accuracy of predicting the workload on the new virtual machine.

[Step S61] After repeating steps S59 and S60 for all the prediction-target time points, the selecting unit 130 ends the process.

[Step S62] The selecting unit 130 predicts the future workload on the new virtual machine using a different method. The different method is described in detail later.

Figure 19:
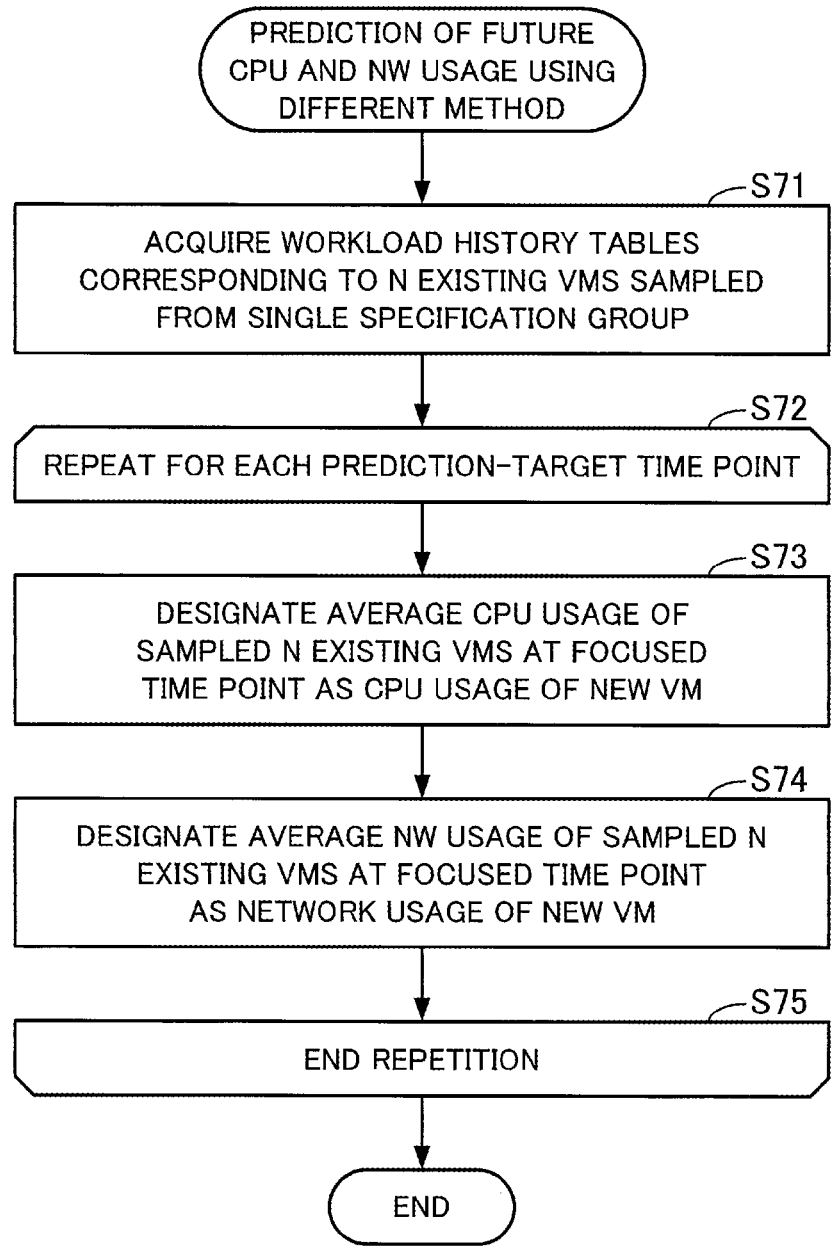
FIG. 19 is a flowchart illustrating an example of predicting the future CPU and network usage using a different method.

FIG. 19 is a flowchart illustrating an example of predicting the future CPU and network usage using a different method. The process of FIG. 19 is described next according to the step numbers in the flowchart. The procedures of FIG.

19 correspond to step S62 of FIG. 18. Note here that, when the procedures of FIG. 19 are performed, the procedures of FIG. 16 have already been performed and, therefore, the N existing virtual machines have already been sampled.

[Step S71] The selecting unit 130 acquires the workload history tables corresponding to the N existing virtual machines sampled from the single specification group.

[Step S72] The selecting unit 130 repeats steps S73 and S74 for each prediction-target time point. The definitions of the prediction-target time points and the focused time points are the same as those described in step S54 of FIG. 18 above. The selecting unit 130 identifies focused time points associated with the prediction-target time points and repeats the following steps S73 and S74 for each of the identified focused time points.

[Step S73] The selecting unit 130 designates the average CPU usage of the sampled N existing virtual machines at the focused time point as predictive CPU usage of the new virtual machine for a prediction-target time point associated with the focused time point. The selecting unit 130 is able to acquire the CPU usage of each existing virtual machine at the focused time point from a workload history table corresponding to the existing virtual machine.

[Step S74] The selecting unit 130 designates the average network usage of the sampled N existing virtual machines at the focused time point as predictive network usage of the new virtual machine for the corresponding prediction-target time point. The selecting unit 130 is able to acquire the network usage of each existing virtual machine at the focused time point from a workload history table corresponding to the existing virtual machine.

[Step S75] After repeating steps S73 and S74 for all the prediction-target time points, the selecting unit 130 ends the process.

In the above-described manner, the management server 100 predicts the workload produced after the new virtual machine is installed. Note that if the selecting unit 130 performs steps S15 and S18 of FIG. 14 once, at the time of selecting a first physical machine, and stores the workload prediction results of the new virtual machine in the storing unit 110, the selecting unit 130 is able to estimate the workload on each of the remaining physical machines using the prediction results.

Therefore, for each of physical machines selected for the second and subsequent times, the selecting unit 130 may acquire, in step S15, the predicted current CPU usage a1 and network usage b1 of the new virtual machine from the storing unit 110. Similarly, for each of the physical machines selected for the second and subsequent times, the selecting unit 130 may acquire, in step S18, the predicted future CPU usage and network usage of the new virtual machine from the storing unit 110. Alternatively, the selecting unit 130 may perform steps S15 and S18 after step S1 and before step S2 and store the prediction results in the storing unit 110.

FIGS. 20A and 20B illustrate examples of future workload predictions for physical machines. FIG. 20A illustrates workload (for example, the CPU usage) prediction results for the physical machine 300 for one week from Sunday, August 1 to Saturday, August 7. The management server 100 is able to acquire the prediction results, for example, based on the workload history of the latest one week (Sunday, July 25 through Saturday, July 31). Line M1 represents a time series of the predicted workload on the existing virtual machine 330. Line M2 represents a time series of the predicted workload on the existing virtual machine 340. Line M3 represents a time series of the predicted workload on the existing virtual machine 350. Line X represents a time series of the predicted workload on the new virtual machine. Line M represents a time series of the predicted workload on the physical machine 300, obtained by adding the workloads represented by Lines M1, M2, M3, and X together for each prediction-target time point.

According to the examples of FIGS. 20A and 20B, the prediction period is one week. For example, because July 25 and August 1 have the same day of the week, the workload on each of the existing virtual machines 330, 340, and 350 at a given time on Sunday, July 25 is associated with the workload of the existing virtual machine 330, 340, or 350 at the same time on Sunday, August 1. Similarly, the workload on the new virtual machine predicted using the workload on one or more existing virtual machines at a given time on Sunday, July 25 is associated with the workload on the new virtual machine at the same time on August 1. The same applies to each instant of time on different dates.

According to the prediction results illustrated in FIG. 20A, the workload on the physical machine 300 exceeds the threshold, for example, on Thursday, August 5 and Friday, August 6. Therefore, the selecting unit 130 does not select the physical machine 300 as an installation target for the new virtual machine.

FIG. 20B illustrates workload (for example, the CPU usage) prediction results for the physical machine 300a for one week from Sunday, August 1 to Saturday, August 7. Line N1 represents a time series of the predicted workload on a first existing virtual machine running on the physical machine 300a. Line N2 represents a time series of the predicted workload on a second existing virtual machine running on the physical machine 300a. Line N3 represents a time series of the predicted workload on a third existing virtual machine running on the physical machine 300a. Line X represents a time series of the predicted workload on the new virtual machine, and is the same as Line X illustrated in FIG. 20A. Line N represents a time series of the predicted workload on the physical machine 300a, obtained by adding the workloads represented by Lines N1, N2, N3, and X together for each prediction-target time point.

According to the prediction results illustrated in FIG. 20B, the workload on the physical machine 300a does not exceed the threshold over the prediction period. Therefore, the selecting unit 130 selects the physical machine 300a as an installation target for the new virtual machine.

Note here that, in step S31 of FIG. 15 and step S51 of FIG. 18, existing virtual machines whose tenant and virtual machine type are the same as those of the new virtual machine are selected. However, it may be considered to select existing virtual machines with specifications similar to those of the new virtual machine. This is because, in step S1 of FIG. 13, specifications not falling into any virtual machine type may be designated for the new virtual machine, instead of the virtual machine type of the new virtual machine being designated.

For example, with respect to each existing virtual machine, the management server 100 stores in advance information on its specifications, operating system, middleware, and status of utilizing a workload distribution structure in the storing unit 110. Then, the selecting unit 130 compares information about the specifications, operating system, middleware, and status of utilizing a workload distribution structure designated for the new virtual machine against the information of each of the existing virtual machines, stored in the storing unit 110, to thereby calculate the degree of similarity between the new virtual machine and each of the existing virtual machines.

Specifically, as for each of the operating system, middleware, and status of utilizing a workload distribution structure, the degree of agreement is determined according to whether the item of each existing virtual machine is the same as or different from that of the new virtual machine. For example, the degree of agreement takes a predetermined positive value if they are the same while the degree of agreement takes a value of 0 if they are different. As for the specifications, the degree of agreement according to the similarity (or the difference) is determined for each of the following items: the number of virtual CPUs; the clock frequency; the memory capacity; the disk capacity; and the number of connected networks. For example, as for each item, such as the number of virtual CPUs, the degree of agreement takes a larger value as there is less difference between a value of the item of each existing virtual machine and that of the new virtual machine. The sum of the degrees of agreement determined for the individual items is designated as the degree of similarity between the new virtual machine and the existing virtual machine.

When the degree of agreement for each item is determined in the above-described manner, the degree of similarity taking a larger value means that a corresponding existing virtual machine is more closely similar to the new virtual machine. Therefore, the selecting unit 130 selects existing virtual machines with the highest degrees of similarity (or selects a predetermined number of existing virtual machines with higher degrees of similarity), to thereby obtain a plurality of existing virtual machines with similar use forms to that of the new virtual machine. In this regard, the selecting unit 130 may perform step S38 or S62 if no existing virtual machine with the degree of similarity being equal to or more than a predetermined value is present.

Note that, according to the physical machine selection process of FIG. 14, amongst physical machines selected in turn, a first physical machine for which "NO" is the determination of step S20 is selected as an installation target of the new virtual machine. However, a different physical machine selection method may be adopted. For example, the selecting unit 130 may perform the selection process of FIG. 14 on all the physical machines. Subsequently, the selecting unit 130 selects, as the installation target of the new virtual machine, a physical machine with the smallest maximum value (or the smallest average value) of the workload predicted over the prediction period on the assumption that the new virtual machine is installed thereon.

Note also that the prediction period is one week in the above description; however, a different time duration, such as one month, may be adopted. For example, in the case where the prediction period is one month, the workload performance on the first Monday of a previous month is used for predicting the workload on the first Monday of the next month, and the workload performance of the second Monday of the previous month is used for predicting the workload on the second Monday of the next month. In this manner, the prediction is possible by further distinguishing days of the same day of the week according to which week of the month each of the days lies.

Figure 21:
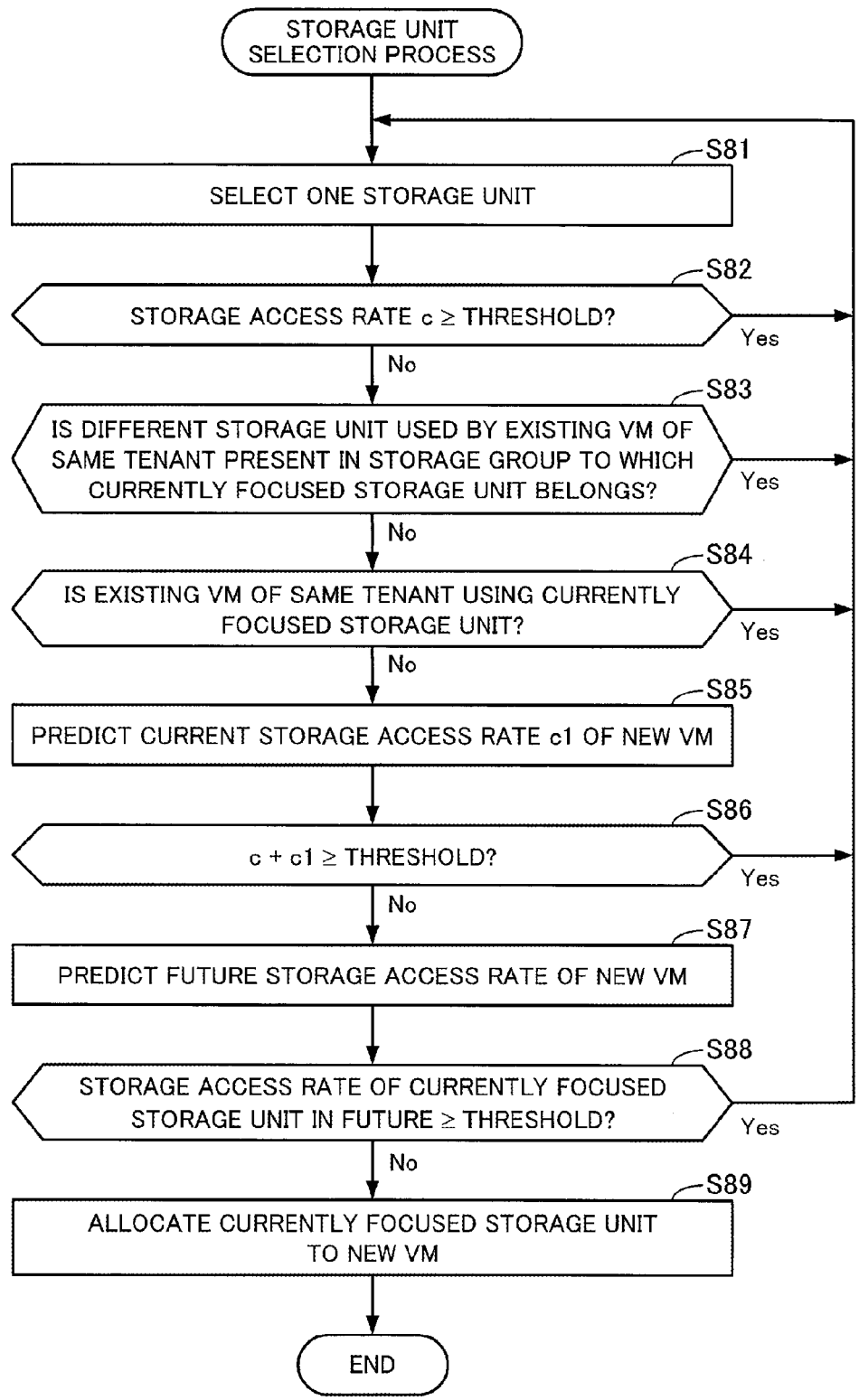
FIG. 21 is a flowchart illustrating an example of a storage unit selection process.

FIG. 21 is a flowchart illustrating an example of a storage unit selection process. The process of FIG. 21 is described next according to the step numbers in the flowchart. The procedures of FIG. 21 correspond to step S3 of FIG. 13.

[Step S81] The selecting unit 130 selects one storage unit amongst the storage units 410, 420, and 430. Note that the selecting unit 130 excludes one or more storage units having already undergone the procedures of step S82 and the subsequent steps from selection targets.

[Step S82] Referring to the storage unit management table 112, the selecting unit 130 acquires a storage access rate c of the selected storage unit. The selecting unit 130 determines whether the storage access rate c is equal to or more than the threshold of the storage access rate registered in the threshold table 113. If the storage access rate c is equal to or more than the threshold, the selecting unit 130 proceeds to step S81. If the storage access rate c is less than the threshold, the selecting unit 130 proceeds to step S83. Note here that, in the threshold table 113, 320 MB/s is registered as the threshold of the storage access rate. Assume for example that the storage unit 410 is selected in step S81. According to the storage unit management table 112, the storage access rate c of the storage unit 410 is 300 MB/s. In this case, the selecting unit 130 determines that the storage access rate c being 300 MB/s is below the threshold 320 MB/s.

[Step S83] The selecting unit 130 determines whether, in a storage group to which the currently focused storage unit belongs, a different storage unit is present which is used by an existing virtual machine whose tenant is the same as the requestor of the new virtual machine installation. If such a different storage unit is present, the selecting unit 130 proceeds to step S81. If no such storage unit is present, the selecting unit 130 proceeds to step S84. The term "storage group" refers to a group of a plurality of storage units in the storage pool 400. The storing unit 110 stores in advance information indicating, for example, that the storage units 410 and 420 belong to a first storage group and the storage 430 belongs to a second storage group. Referring to the information stored in the storing unit 110, the selecting unit 130 is able to make the determination of step S83.

[Step S84] Referring to the storage unit management table 112 and the virtual machine management table 114, the selecting unit 130 determines whether an existing virtual machine whose tenant is the same as the requestor of the new virtual machine installation is using the currently focused storage unit. If the existing virtual machine is using the storage unit, the selecting unit 130 proceeds to step S81. If not, the selecting unit 130 proceeds to step S85. For example, the selecting unit 130 refers to the storage unit management table 112 to thereby acquire names of virtual machines running on the currently focused storage unit. Then, the selecting unit 130 refers to the virtual machine management table 114 to thereby acquire tenant names each corresponding to one of the acquired virtual machine names. The selecting unit 130 determines whether the tenant name of the requestor of the new virtual machine installation is included in the acquired tenant names. Herewith, the determination of step S84 is implemented. In the case where the tenant name is included in the acquired tenant names, a different virtual machine of the requestor is using the storage unit. On the other hand, if the tenant name is not included in the acquired tenant names, a different virtual machine of the requestor is not using the storage unit.

[Step S85] The selecting unit 130 predicts the current storage access rate $c1$ of the new virtual machine. The prediction method follows the same procedures as in FIGS. 15 and 16 (the determination of step S33 is made using the current storage access rate of each existing virtual machine). The selecting unit 130 predicts the storage access rate $c1$ instead of the CPU usage $a1$ and the network usage $b1$. For example, in the case of performing processes corresponding to steps S34 and S35, the selecting unit 130 designates, amongst the current storage access rates of the currently focused existing virtual machines, the largest value as $c1$. In the case of performing processing corresponding to steps S36 and S37, the selecting unit 130 designates, as c1, a value obtained by dividing a total value of the storage access rates of the currently focused existing virtual machines by ($N_{fe}+1$). In the case of performing processing corresponding to steps S43 and S44, the selecting unit 130 designates, as c1, the average storage access rate of the sampled N existing virtual machines (the storage access rate may be used as the workload information to sample existing virtual machines).

[Step S86] The selecting unit 130 determines whether the sum (c+c1) of the storage access rate c used for the determination of step S82 and the storage access rate c1 predicted in step S85 is equal to or more than the threshold of the storage access rate, registered in the threshold table 113. If it is equal to or more than the threshold, the selecting unit 130 proceeds to step S81. If it is less than the threshold, the selecting unit 130 proceeds to step S87.

[Step S87] The selecting unit 130 predicts the future storage access rate of the new virtual machine. The prediction method follows the same procedures as in FIGS. 18 and 19. The selecting unit 130 predicts the storage access rates instead of the CPU usage and the network usage (the determination of step S53 is made using the current storage access rate and the past storage access rates of each existing virtual machine). For example, in the case of performing processing corresponding to steps S55 and S56, the selecting unit 130 designates the largest value among the storage access rates of the currently focused existing virtual machines at the focused time point as a predictive storage access rate of the new virtual machine for a prediction-target time point associated with the focused time point. In the case of performing processing corresponding to steps S59 and S60, the selecting unit 130 designates, as the predictive storage access rate of the new virtual machine for the prediction-target time point, a value obtained by dividing a total value of the storage access rates of the currently focused existing virtual machines at the focused time point by ($N_{fe}+1$). In the case of performing processing corresponding to steps S73 and S74, the selecting unit 130 designates the average storage access rate of the sampled N existing virtual machines at the focused time point as a predictive storage access rate of the new virtual machine for the prediction-target time point. The selecting unit 130 is able to acquire the storage access rate of each existing virtual machine at the focused time point from the workload history table of the existing virtual machine.

[Step S88] According to the prediction results obtained in step S87, the selecting unit 130 determines whether the storage access rate of the currently focused storage unit reaches or exceeds the threshold in the future. If the storage access rate reaches or exceeds the threshold, the selecting unit 130 proceeds to step S81. If the storage access rate remains below the threshold, the selecting unit 130 proceeds to step S89. The method for predicting the future storage access rate of the storage unit in step S88 is the same as the method for predicting the future workload on the physical machine illustrated in FIGS. 20A and 20B. That is, the sum of the storage access rates of existing virtual machines using the storage unit at a prediction-target time point (within the prediction period) and the storage access rate (predicted access rate) of the new virtual machine is the total storage access rate for the storage unit at the prediction-target time point. If the total storage access rate for the storage unit remains below the threshold at all the prediction-target time points, the selecting unit 130 proceeds to step S89. If the total storage access rate for the storage unit reaches or exceeds the threshold at any of the prediction-target time points, the selecting unit 130 proceeds to step S81.

[Step S89] The selecting unit 130 determines to allocate the currently focused storage unit to the new virtual machine. The selecting unit 130 notifies the installing unit 140 of the determined result.

In the above-described manner, the management server 100 selects a storage unit to be allocated to the new virtual machine. Herewith, it is possible to prevent the storage units 410, 420, and 430 from being put under excessive workloads in connection with the installation of the new virtual machine.

Figure 22:
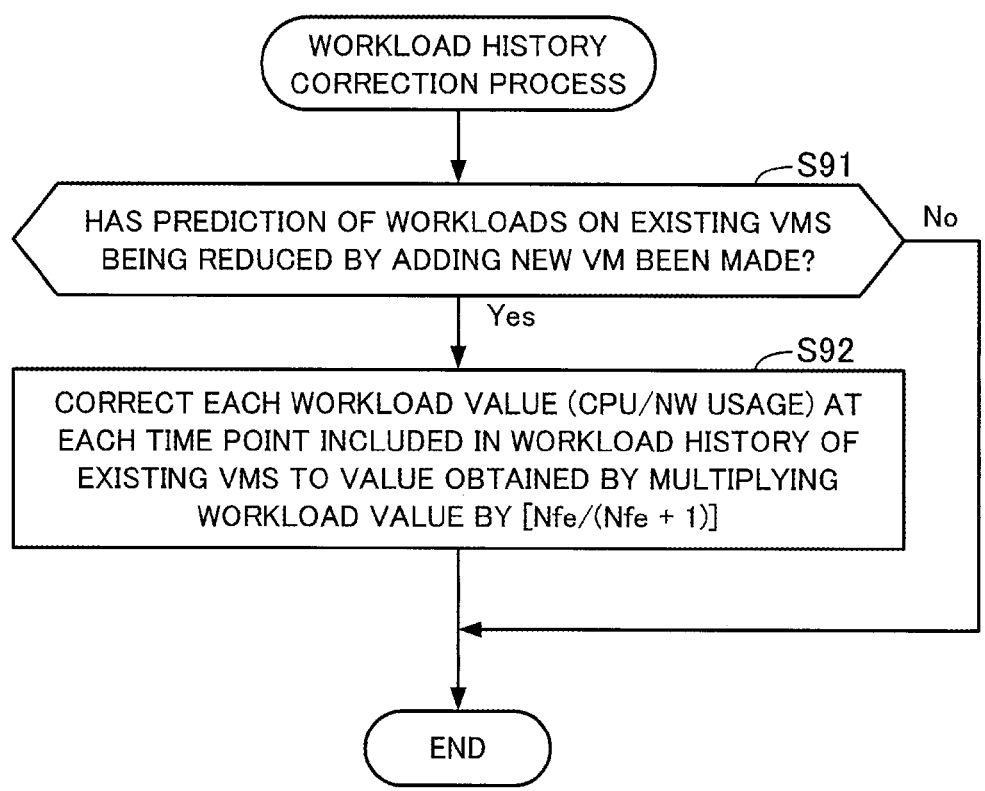
FIG. 22 is a flowchart illustrating an example of a workload history correction process.

FIG. 22 is a flowchart illustrating an example of a workload history correction process. The process of FIG. 22 is described next according to the step numbers in the flowchart. The procedures of FIG. 22 correspond to step S6 of FIG. 13.

[Step S91] The selecting unit 130 determines whether to have made a prediction of the workloads on the existing virtual machines being reduced by adding the new virtual machine. If having made the prediction, the selecting unit 130 proceeds to step S92. If no such prediction has been made, the selecting unit 130 ends the process. Note here that the "prediction of the workloads on the existing virtual machines being reduced by adding the new virtual machine" refers to the prediction processing of steps S36 and S37 of FIG. 15 and the prediction processing of steps S59 and S60 of FIG. 18. That is, when at least steps S36 and S37 or steps S59 and S60 have been performed, the selecting unit 130 determines to have made the "prediction of the workloads on the existing virtual machines being reduced". When neither steps S36 and S37 nor steps S59 and S60 have been performed, the selecting unit 130 determines not to have made the "prediction of the workloads on the existing virtual machines being reduced".

[Step S92] The selecting unit 130 corrects the workload values (i.e., the CPU and network usage) at each time point included in the workload history tables corresponding to the existing virtual machines focused in steps S36 and S37 of FIG. 15 and steps S59 and S60 of FIG. 18. Specifically, the selecting unit 130 calculates a corrected workload value for each time point by multiplying each workload value at the time point by $\{N_{fe}/(N_{fe}+1)\}$. Note that the number of existing virtual machines $N_{fe}$ does not include the new virtual machine installed this time (i.e., the number of existing virtual machines $N_{fe}$ takes the same value as the number of existing virtual machines used in the calculations of steps S36, S37, S59, and S60).

In the above-described manner, the management server 100 corrects values in the workload history tables of the existing virtual machines. Herewith, in selecting an installation-target physical machine for a different new virtual machine after the correction, it is possible to predict the workload on the different new virtual machine and the workload on each of the physical machines by taking into account the reduction in the workloads on the existing virtual machines due to the new virtual machine installed this time. This further improves the accuracy of predicting the workload on each of the physical machines.

Figure 23:
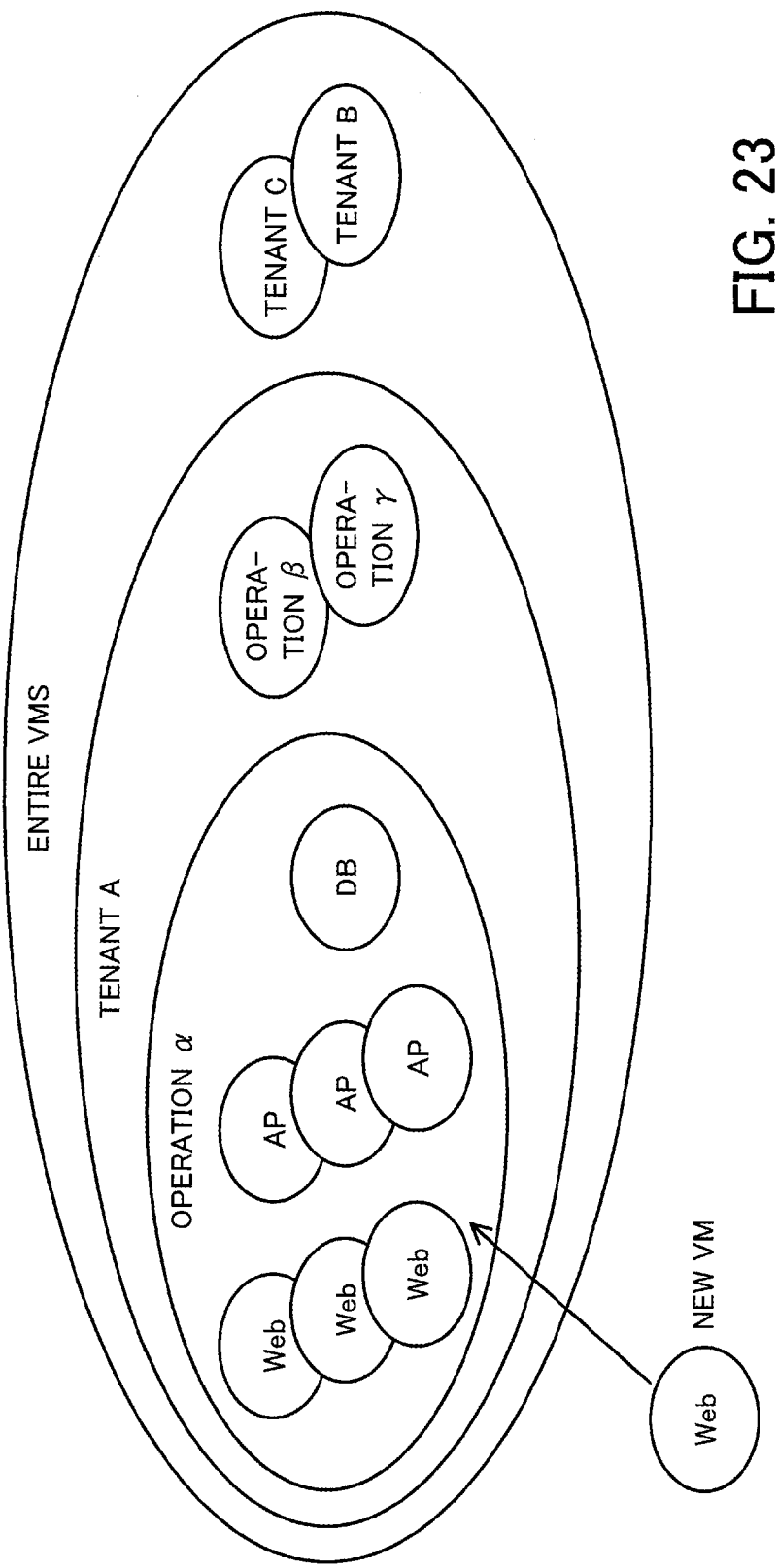
FIG. 23 illustrates an installation example of a new virtual machine.

FIG. 23 illustrates an installation example of the new virtual machine. For example, a plurality of existing virtual machines running on a plurality of physical machines include virtual machines used by various tenants. In order to predict the workload on a virtual machine to be newly installed from now, the management server 100 selects one or more appropriate existing virtual machines amongst the plurality of existing virtual machines. The management server 100 predicts the workload on the new virtual machine using the workloads on the selected existing virtual machines, to thereby improve the prediction accuracy.

For example, the entire existing virtual machines include virtual machines of tenants A, B, and C. In addition, the tenant A engages in various operations such as operations α, β, and γ. Virtual machines used for each operation use various types of operating systems and middleware. In view of the above, the management server 100 reduces the number of existing virtual machines to be targeted by selecting those with the same tenant and the same virtual machine type as (or a similar virtual machine type to) the new virtual machine. This is because the new virtual machine is likely to be used for the same purpose as the existing virtual machines with the same tenant and virtual machine type.

Let us focus on the operation a of the tenant A. The operation a is built on a three tier Web architecture. In this case, as virtual machines each used as a Web server, those with the same virtual machine type are likely to be selected. Similarly, as virtual machines each used as an application server, those with the same virtual machine type are likely to be selected. As virtual machines each used as a database server, those with the same virtual machine type are likely to be selected. For example, when the tenant A requests installation of a new virtual machine, if the virtual machine type of the new virtual machine is the same as (or similar to) that of a group of Web servers of the tenant A, the new virtual machine is likely to be used as a Web server. Therefore, an accurate prediction of the workload on the new virtual machine is made by using the workload history of the group of existing virtual machines of the tenant A, having the same virtual machine type as the new virtual machine. Herewith, the management server 100 facilitates high-accuracy workload prediction for physical machines being installation-target options, thus enabling the selection of an appropriate installation-target physical machine.

Note that the information processing of the first embodiment is implemented by causing the calculating unit 1b to execute a program. In addition, the information processing of the second embodiment is implemented by causing the processor 101 to execute the program. The program may be recorded in the computer-readable storage medium 13. For example, the storage media 13 on which the program is recorded are distributed in order to distribute the program. In addition, the program may be stored in a different computer and then distributed via a network. A computer stores, or installs, the program recorded in the storage medium 13 or received from the different computer in a storage device, such as the RAM 102 or the HDD 103, and reads the program from the storage device to execute it.

According to one aspect, it is possible to appropriately select an installation-target physical machine.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A workload distribution management apparatus comprising:
    a memory configured to store first information about a use form of each of existing virtual machines already deployed on physical machines and history information indicating a past workload status of the each of the existing virtual machines; and
    a processor configured to perform a procedure to install a new virtual machine on one of the physical machines including:
        selecting one or more existing virtual machines amongst the existing virtual machines based on the first information and second information about a use form of the new virtual machine;
        predicting a workload on each of the physical machines being installation-target options for the new virtual machine by using the history information of the selected existing virtual machines and a number of the selected existing virtual machines; and
        determining, amongst the physical machines, an installation-target physical machine based on results of the predicting,
        the selecting includes selecting one or more existing virtual machines being used by a user of the new virtual machine amongst the existing virtual machines, and
        the predicting includes using an average workload to predict the workload on the each of the physical machines, the average workload being calculated by dividing a sum of workloads on the selected one or more existing virtual machines being used by the user of the new virtual machine at a predetermined time in past by a value obtained by adding 1 to the number of the selected existing virtual machines.

2. The workload distribution management apparatus according to claim 1, wherein:
    the predicting includes selecting, when two or more existing virtual machines of the existing virtual machines are selected amongst the existing virtual machines being used by the user of the new virtual machine, one of a first method and a second method for predicting the workload on the each of the physical machines according to a difference in, or a deviation of, the workloads on the selected one or more existing virtual machines being used by the user of the new virtual machine, the first method using the average workload and the second method using a maximum workload amongst the workloads on the selected one or more existing virtual machines being used by the user of the new virtual machine.

3. The workload distribution management apparatus according to claim 1, wherein:
    the procedure further includes correcting, based on the number of the selected existing virtual machines, information about the workloads on the selected one or more existing virtual machines being used by a user of the new virtual machine, wherein the information is included in the history information.

4. The workload distribution management apparatus according to claim 1, wherein:
    the selecting includes selecting the existing virtual machines based on a created date and time of the each of the existing virtual machines in addition to the first information and the second information.

5. The workload distribution management apparatus according to claim 4, wherein:
    the selecting includes preferentially selecting, amongst the existing virtual machines, a plurality of existing virtual machines with newer created dates and times and workloads exceeding a predetermined value; and the predicting includes using workloads on the selected one or more existing virtual machines being used by the user of the new virtual machine at the predetermined time in past to predict the workload on the each of the physical machines.

6. The workload distribution management apparatus according to claim 1, wherein:

the use form of the each of the existing virtual machines, included in the first information, and the use form of the new virtual machine, included in the second information, include at least one of information items including a resource amount allocated to a corresponding virtual machine, software used by the corresponding virtual machine, and a service type applied to the corresponding virtual machine.

7. The workload distribution management apparatus according to claim 1, wherein:

the selecting includes selecting the existing virtual machines based on a degree of an agreement between a values set for each of a plurality of information items defined for use forms included in the first information and the second information.

8. The workload distribution management apparatus according to claim 1, wherein:

the each of the existing virtual machines is able to access one of a plurality of storage units;

the history information includes history records regarding storage access rates of each of the existing virtual machines; and the procedure further includes:

predicting, based on the history records of the selected one or more existing virtual machines being used by the user of the new virtual machine, an access rate to each of the storage units affected by the installation of the new virtual machine, and determining, amongst the storage units, a storage unit that the new virtual machine is to be allowed to access based on results of the predicting.

9. The workload distribution management apparatus according to claim 1, wherein:

the determining includes determining, as the installation-target physical machine, a physical machine whose workload predicted for a predetermined period in future remains below a threshold.

10. A control method comprising:

a series of steps to install a new virtual machine on one of physical machines by:

selecting, by a computer, one or more existing virtual machines amongst a plurality of existing virtual machines already deployed on the physical machines based on information about a use form of the new virtual machine and information about a use form of each of the existing virtual machines;

predicting, by the computer, a workload on each of the physical machines being installation-target options for the new virtual machine by using history information indicating a past workload status of each of the selected existing virtual machines and a number of the selected existing virtual machines; and determining, by the computer, an installation-target physical machine based on results of the predicting;

the selecting includes selecting, by the computer, one or more existing virtual machines being used by a user of the new virtual machine amongst the existing virtual machines; and the predicting includes using, by the computer, an average workload to predict the workload on the each of the physical machines, the average workload being calculated by dividing a sum of workloads on the selected one or more existing virtual machines being used by the user of the new virtual machine at a predetermined time in past by a value obtained by adding 1 to the number of the selected existing virtual machines.

11. A non-transitory computer-readable storage medium storing a computer program that causes a computer to perform a procedure comprising:

a series of steps to install a new virtual machine on one of physical machines by:

selecting one or more existing virtual machines amongst a plurality of existing virtual machines already deployed on the physical machines based on information about a use form of the new virtual machine and information about a use form of each of the existing virtual machines;

predicting a workload on each of the physical machines being installation-target options for the new virtual machine using history information indicating a past workload status of each of the selected existing virtual machines and a number of the selected existing virtual machines; and determining an installation-target physical machine based on results of the predicting;

the selecting includes selecting one or more existing virtual machines being used by a user of the new virtual machine amongst the existing virtual machines; and the predicting includes using an average workload to predict the workload on the each of the physical machines, the average workload being calculated by dividing a sum of workloads on the selected one or more existing virtual machines being used by the user of the new virtual machine at a predetermined time in past by a value obtained by adding 1 to the number of the selected existing virtual machines.

\* \* \* \* \*